United States Patent [19]

Shaw

[11] 4,242,872
[45] Jan. 6, 1981

[54] ATTIC MOUNTED SOLAR ASSIST MULTI-SOURCE/SINK RESIDENTIAL HEAT PUMP SYSTEM

[75] Inventor: David N. Shaw, Unionville, Conn.

[73] Assignee: Dunham-Bush, Inc., West Hartford, Conn.

[21] Appl. No.: 970,789

[22] Filed: Dec. 18, 1978

Related U.S. Application Data

[63] Continuation-in-part of Ser. No. 950,905, Oct. 12, 1978, which is a continuation-in-part of Ser. No. 924,015, Jul. 11, 1978, which is a continuation-in-part of Ser. No. 882,729, Mar. 2, 1978, which is a continuation-in-part of Ser. No. 806,407, Jun. 14, 1977, Pat. No. 4,148,436, which is a continuation-in-part of Ser. No. 782,675, Mar. 30, 1977, Pat. No. 4,086,072, which is a continuation-in-part of Ser. No. 653,586, Jan. 29, 1976, Pat. No. 4,058,988.

[51] Int. Cl.³ ............................ F24J 3/02; F25B 27/00
[52] U.S. Cl. ........................................ 62/2; 62/238 E; 126/427; 237/2 B
[58] Field of Search ............... 62/238 E, 324 D, 2; 237/2 B; 126/427

[56] References Cited

U.S. PATENT DOCUMENTS

| | | | |
|---|---|---|---|
| 2,780,415 | 2/1957 | Gay | 165/48 X |
| 4,066,118 | 1/1978 | Goettl | 237/2 B |
| 4,143,815 | 3/1979 | Meysenburg | 62/238 E |

Primary Examiner—William E. Wayner

Attorney, Agent, or Firm—Sughrue, Rothwell, Mion, Zinn and Macpeak

[57] ABSTRACT

A solar-assisted multiple source and multiple sink heat pump system for use in residential homes includes a solar/air coil mounted in the attic of the residential home and selectively open to the attic interior with the attic roof bearing a solar window with selective shield permitting the attic solar space to constitute a passive solar collector. The solar/air coil is positioned within duct work which selectively opens to the attic interior or the outside air to permit thermal energy pick up from the attic solar space or outside air or wasting of heat thereto. The inside air coil is also mounted in a separate duct work within the attic shielded from the attic interior but selectively open thereto and to and from the building interior beneath the attic for adding heat to the building interior or removing the same. One or more thermal storage tanks may constitute heat and cold sinks. Energy amplified by the heat pump may be delivered to inside air, a domestic hot water heater within the building, hydronic heating system water within the building space to be conditioned, the storage system tank media, or alternatively discharged to the outside air through the solar/outside air coil in the case of net requirement for rejection to ambient through the heat pump system. Direct room heating from the solar space or cooling by outside air flow is achieved without heat pump operation, and free-wheeling to and from storage media is provided.

10 Claims, 12 Drawing Figures

HEATING MODE
SOLAR HEATED AIR
NO HEAT PUMP OPERATION

HEATING MODE
DOMESTIC HOT WATER
HEATING, CHARGING STORAGE
TANK, BOOST TO SOLAR
HEATED AIR.

HEATING MODE

FULL HEATING OF RETURNING AIR, DOMESTIC HOT WATER HEATING, CHARGING OF STORAGE TANK.

HEATING MODE
NO SOLAR RADIATION,
OUTSIDE AIR SOURCE,
FULL HEATING OF RETURN AIR,
DAYTIME CHARGING OF STORAGE
TANK, DOMESTIC HOT WATER
HEATING AND HYDRONIC HEATING
OF RESIDENTIAL SPACE

COOLING MODE

OUTSIDE AIR DIRECT COOLING, HEAT PUMP DOMESTIC HOT WATER HEATING AND CHARGING OF STORAGE TANK.

COOLING MODE
HEAT PUMP OPERATION
WITH ROOM COOLING,
DOMESTIC HOT WATER HEATING
AND STORAGE TANK CHARGING.

COOLING MODE
HEAT PUMP FOR
SPACE COOLING ONLY

ATTIC MOUNTED SOLAR ASSIST MULTI-SOURCE/SINK RESIDENTIAL HEAT PUMP SYSTEM

CROSS-REFERENCE TO RELATED APPLICATIONS

This application is a continuation-in-part application of application Ser. No. 950,905, filed Oct. 12, 1978, entitled "Reciprocating Compressor Refrigeration System Using Step Expansion And Autostaging," which application is a continuation-in-part application of application Ser. No. 924,015, filed July 11, 1978, entitled "Integrated Thermal Solar Heat Pump System," which application is a continuation-in-part application of application Ser. No. 882,729, filed Mar. 2, 1978, entitled "Tri-Level Multi-Cylinder Reciprocating Compressor Heat Pump System," which application is a continuation-in-part application of application Ser. No. 806,407, now U.S. Pat. No. 4,148,436 filed June 14, 1977, entitled "Solar Augmented Heat Pump System With Automatic Staging Reciprocating Compressor," which application is a continuation-in-part application of application Ser. No. 782,675, filed Mar. 30, 1977, entitled "Air Source Heat Pump With Multiple Slide Rotary Screw Compressor/Expander," now U.S. Pat. No. 4,086,072, issuing Apr. 25, 1978, which in turn is a continuation-in-part application of application Ser. No. 653,586, filed Jan. 29, 1976, entitled "Heat Pump System With High Efficiency Reversible Helical Screw Rotary Compressor," now U.S. Pat. No. 4,058,988, issuing Nov. 22, 1977, all assigned to the common assignee.

BACKGROUND OF THE INVENTION

Heat pump systems have come into high vogue in recent times due to the high cost of fuel and because the systems are of a reversible nature, permitting changeover from winter to summer use, with the system heating the space to be conditioned in the winter and cooling the same in the summer. Heat pump systems employ positive displacement refrigerant compressors normally in the form of single or multiple reciprocating pistons, multiple intermeshed helical screws, rotary sliding vanes, etc. to pressurize a refrigerant, such as Freon, which circulates through a closed refrigerant loop, including one coil within the space to be conditioned and a second coil external of that space. The coil within the space acts as a system evaporator during cooling of the space to be conditioned, with that coil functioning as a system condenser when the space is being heated. This is achieved by alternate reversal of refrigerant flow, and where heat is being discharged into that space, the heat is picked up by the coil external of the space functioning as the system evaporator. Additionally, waste heat may be removed from the space either by that coil or additional coil or coils functioning as system evaporators and the energy may be wasted to the atmosphere. Alternatively, it may be stored for subsequent resupply to the space to be conditioned by means of a heat storage media thermally insulated from the space to be conditioned, and under some circumstances being located within that space. Thermal energy may be picked up by solar radiation in addition to thermal energy picked up by the coil external of the space and normally within the outside air, although, in some cases the outside coil is positioned in the ground for either waste heat discharge to the ground or pickup of heat from the ground.

Solar energy has been fed to heat pump systems. Solar collectors, particularly in residential systems, have been simply placed on the sloping roof of the building facing the predominant source of solar radiation and pickup is achieved by the circulation of a liquid or other medium between the collectors and a storage tank which also includes an evaporator coil forming a part of the closed loop refrigeration system including the compressor and the other coils mentioned above. Such solar collectors introduce a second heat transmission fluid or medium and normally pumps are required to circulate that medium, and where liquids are used, special precautions must be taken, particularly in the winter, to prevent the liquid from freezing and damaging or destroying the solar loop including the collectors themselves.

In the heat pump art itself, systems have been devised, particularly for residential use, which are mounted within the attic and which include duct work connecting the coils situated within the attic and the room or rooms to be conditioned below the attic floor and to the building exterior. An inside or indoor coil mounted within such duct work provides the necessary heat transfer between the refrigerant fluid circulating within the coil and the air flow through the duct work to circulate conditioned air to the room or rooms beneath the attic floor. Further, there have been some attempts to employ solar windows within the roof to permit the interior of the attic to be employed as a solar collector in which the attic air constitutes the media being heated, and which air is either circulated directly to the space to be conditioned or in heat transfer with coils of the heat pump system to achieve indirect thermal energy transfer between the air occupying the attic and that circulated to and from the space being conditioned.

Residential heat pump systems today must be designed so that the system is fully capable of meeting the necessary cooling or heating loads to the space or spaces to be conditioned throughout the year regardless of temperature variation and in a manner that insures maximum efficiency in achieving that conditioning, not only because of the relatively high cost of energy today but because of the need for conservation of our available energy resources. Such systems include an outside air coil, solar source coil, storage coil, inside air coil, hot water coil and the like all operating at different temperatures and within different environments. Since these operating parameters vary from day to day and even from hour to hour depending upon the need for heating, cooling, dissipation, or storage of thermal energy, compressors are required having variable capacity capability and operating efficiently regardless of compressor load variation and also having the capability of permitting both intermediate pressure level return of refrigerant vapor to the compressor or removal from the compressor of refrigerant vapor partially compressed—that is, at intermediates pressure level with respect to compressor suction and full discharge. In the past, such systems have employed complicated conduits, reversing valves and the like to selectively operate the coils in either condensor or evaporator function and hopefully match the coil operating parameters to available vapor return and vapor supply pressures of the compressor.

It is therefore a primary object of the present invention to provide an improved residential heat pump system which may be appropriately attic mounted in terms of much of its componentry, with the roof bearing a solar window and the attic employed as a passive solar collector, and wherein the system incorporates a plurality of elements defining multiple thermal sources and heat sinks to maximize heat pump system efficiency, whether under heating or cooling mode.

It is a further object of this invention to provide an improved attic mounted solar assist multi-source/sink residential heat pump system which employs a plurality of coils functioning in heat source or heat sink fashion and which operate at varying pressure levels, and wherein the heat pump system incorporates a compression module permitting vapor return and vapor discharge at intermediate pressure levels relative to compressor suction and discharge to match coil needs to compressor capability.

It is a further object of the present invention to provide an improved attic mounted solar assist multi-source/sink residential heat pump system in modular form which utilizes both a compression module for acceptance and deliverance of refrigerant vapor at different pressure levels and which is characterized by the absence of a reversing valve and its attendant control, and wherein a plurality of coils function as multiple heat sources or heat sinks and for desired space and component heating and cooling and being connected within a closed refrigeration loop through discharge, suction, liquid feed and liquid drain manifolds common to these elements, and wherein the multiple coils may be connected selectively to either the high side or low side of the compressor and at different pressure levels.

SUMMARY OF THE INVENTION

The present invention has application to a heat pump refrigeration system for conditioning a residential building space or the like where the building includes an attic which is thermally isolated from the space to be conditioned, the attic including a solar window which faces a solar radiation source such that the attic defines a passive solar collector and forms a solar space. The refrigeration system comprises at least a first heat exchange coil and a second heat exchange coil, which coils function as evaporators or condensers to absorp heat and discharge heat, respectively. A compressor is provided to the refrigeration system, and conduit means carrying refrigerant and defining a closed refrigeration loop circuit includes the coils and said compressor and additionally means for selectively operating the first and second heat exchange coils as evaporator or condenser as required.

The improvement resides in a first and second duct within the attic, the first duct housing said first coil and having an inlet and an outlet. The second duct, which is thermally insulated from the first duct, houses a second coil and additionally has an inlet and an outlet. Blower means are provided for forcing air flow through the ducts. Means permit selective communication of the first duct inlet and outlet to the building exterior or to the attic solar space, and said second duct outlet opens into the building space to be conditioned, while means are further provided for communicating the second duct inlet to at least the space to be conditioned, whereby the first coil functions to pick up heat from the solar space or from the outside when functioning as system evaporator, or to discharge heat to the outside when functioning as system condenser, and the second coil functions to heat or cool the space to be conditioned when functioning as a condenser or evaporator, respectively. Preferably, there is an air return opening leading from the space to be conditioned which opens into the second duct upstream of the second coil, and means are provided for selectively communicating the second duct inlet to said air return opening, with said second duct shut off from the outside or said solar space, said second duct inlet and said opening communicated to said solar space, or the second duct inlet and said air return opening communicated to the building exterior.

The first duct may comprise a fresh air inlet grill opening to the building exterior at the inlet side of the first coil and an air discharge grill opening to the building exterior at the outlet side of the first coil. Preferably, the blower means is positioned within the first duct downstream of the first coil, and the first duct further comprises an opening within the first duct upstream of the first coil communicating to the solar space. A first damper is provided within said first opening and is pivotable between a position closing off that opening to the solar space and permitting fresh air flow from the building exterior to the first coil, and a second position blocking flow of fresh air from the fresh air grill to the first coil but permitting air flow from the solar space through the first coil. The first duct further comprises a second opening which opens to said solar space downstream of the first blower and between the first blower and the air discharge grill, with a second damper mounted to the first grill at the second opening and movable between positions closing off communication of the first duct outlet to the solar space but permitting communication to the building exterior through said air discharge grill, and a second position blocking off air discharge to the building exterior and forcing air discharging from the first blower to pass through said second opening and enter said solar space.

The second duct may comprise an air return grill overlying the air return opening and a further opening provided within the second duct communicating the second duct to the solar space, with a second duct damper covering said second opening and being movable between a first position closing off said second opening to permit return air to pass through said second coil, and a second position in which said return air is permitted to pass through the opening covered by the second duct damper into the solar space and permitting heated air within the solar space to additionally pass through the second coil from said second opening and into said second duct outlet.

Preferably, a first cross communication duct is connected at one end to said first duct downstream of said blower, and said first duct second damper and in fluid communication therewith, and being connected at its opposite end to said second duct adjacent said air return grill and in fluid communication therewith, and a flow blocking damper is mounted within said first communication duct intermediate of its ends and being movable between a position blocking air flow therethrough and an unblocking position in line therewith such that under cooling mode in absence of said second coil functioning as an evaporator coil, the heated air from the space to be conditioned may exit to the building exterior to said air return grill, the first communication duct and the first duct air discharge grill at the end of the first duct. A second communication duct is preferably connected at one end to the first duct upstream of the first duct first damper and at its opposite end to the second duct upstream of said second blower, with said second communication duct including an air flow blocking damper mounted within said second communication duct intermediate of its ends and movable between a first position blocking air flow through said second communication duct and in a second position in line therewith such that when said first duct dampers are in a position to block communication between the fresh air inlet grill and the air discharge grill through said first coil, operation of said second blower induces fresh air flow through said fresh air inlet grill and through said second communication duct for cooling of the space to be conditioned while permitting return air flow from the space to be conditioned to exit to the building exterior through said air return grill, said second duct, said first communication duct and said air discharge grill of said first duct.

DESCRIPTION OF THE PREFERRED EMBODIMENTS

Figure 1:
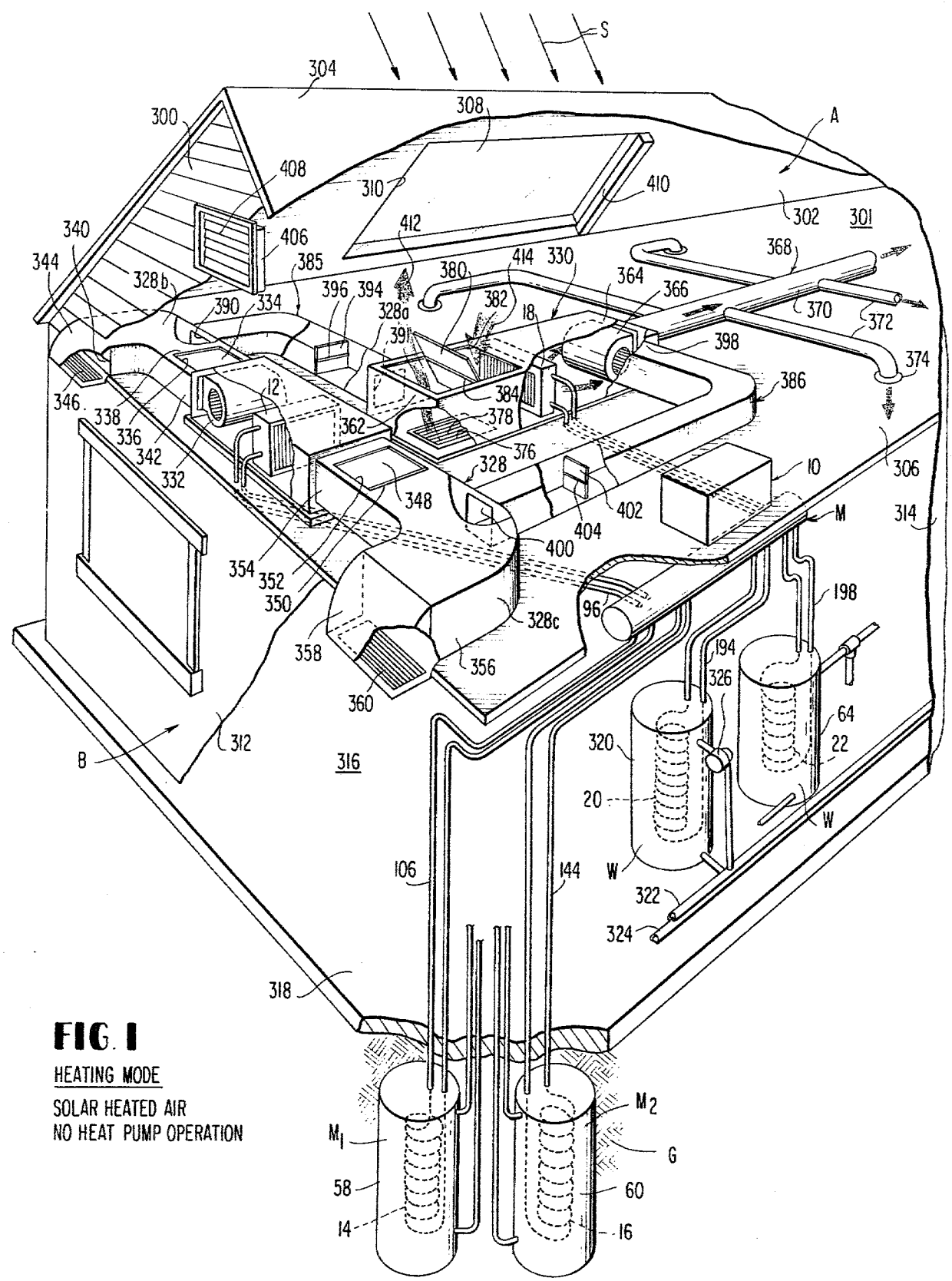
FIG. 1 is a partial broken away perspective view and partial schematic diagram of one embodiment of the attic mounted solar assist multi-source/sink residential heat pump system of the present invention in a solar heating mode without heat pump operation.

Referring first to FIG. 1, there is shown in partial perspective (broken away) and partial schematic form one embodiment of the residential heat pump system in attic mounted form constituting a first embodiment of the present invention and providing for solar assist and employing multiple thermal energy sources and thermal energy sinks for the heat pump system. The heat pump system is exemplified in the form of an air source heat pump system and employing the attic A of a residential building B to house the major components of the heat pump system as well as the utilization of the interior or solar space 301 within the attic A as a solar heat trap. Attic A is defined by end walls 300, roof sides 302 and 304 and attic floor 306. The solar heat trap is achieved by the utilization of a solar window glass pane 308 which is fitted to an opening 310 within the inclined roof side 302 which faces the source of solar radiation, as indicated by arrows S. The interior of the attic space may be painted black to enhance thermal retention. The building B, in addition to the inclined roof side walls 302 and 304, is provided with vertical end walls 312 at opposed ends and opposed longitudinally extending side walls, as at 314, defining with a floor 318 a rectangular space 316 to be conditioned. The residential space 316 to be conditioned is thus located beneath the attic floor 306 and above the building floor 318. For illustrative purposes, the building B has been shown as having a base of concrete slab construction, with floor 318 formed of concrete.

Figure 8:
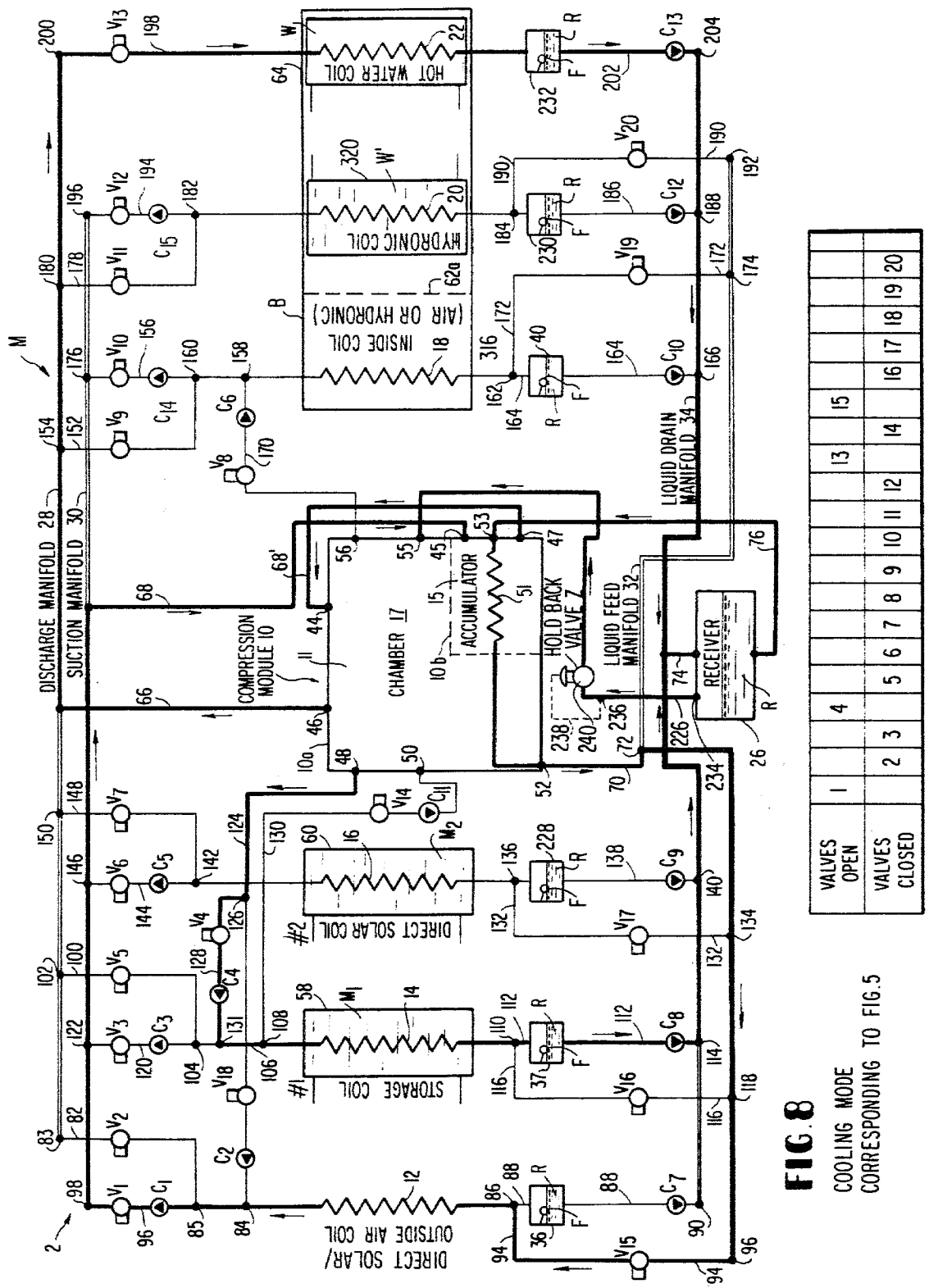
FIG. 8 is a hydraulic schematic diagram of the attic mounted solar assist multi-source/sink residential heat pump system of the FIG. 1 embodiment of the present invention, under the cooling mode as illustrated in FIG. 5.

With respect to the componentry of the heat pump system of the present invention, the system makes use of a pair of storage tanks indicated at 58 and 60 and which are located within the ground G, below the concrete floor 318 and constituting important thermal storage elements for the heat pump system. Only one storage tank may be employed and located within the building interior. In addition, interiorly within the space to be conditioned 316, there is located an insulated, hot water tank 64 as well as a hydronic heat exchange tank 320. Tank 320 carries water which is circulated through a closed loop baseboard heating system via conduits 322 and 324 by energization of pump 326. Tank 320 could be eliminated as well as the hot water tank 64 if desired. In addition to these elements which are external of the solar space 301 of attic A, the heat pump system includes within the attic a direct solar/outside air coil 12 mounted within lateral or transverse duct indicated generally at 328 and an inside air coil 18 mounted within a longitudinally extending duct indicated generally at 330. Within the attic A, there may be provided a compression module indicated generally at 10, which compression module may be identical to the compression module of applications Ser. Nos. 924,015 and 950,905 referred to previously. Alternatively, the compression module could be located within another area of the building, such as the basement. With respect to coils 12 and 18 which form elements of a closed loop refrigeration system which include a first storage coil 14 within the storage tank 58 and a second storage coil 16 within storage tank 60, there is provided a hot water coil 22 carried within domestic hot water tank 64 as well as the inside hydronic coil 20 located within the hydronic tank 320. Effective thermal energy exchange is achieved between these various principle elements of the heat pump system through the use of the compression module 10 by provision of a suitable interface constituted in a preferred form by a manifold system M. The manifold system M could be located within the building below attic A if desired. The manifold system M comprises a discharge manifold 28, a suction manifold 30, a liquid feed manifold 32 and a liquid drain manifold 34 (FIG. 8). As specifically seen in FIG. 8, through the utilization of appropriate solenoid operated control valves and check valves of manifold system M, flow of a suitable refrigerant R, such as Freon, under pressure produced by the compression module 10 or under "free-wheeling" principles, effects the efficient addition of heat or extraction of heat from space 316 to be conditioned internally of the building B and the supply of heat to the hot water tank 64, as well as the appropriate storage of heat or cool within storage tank 1 and/or storage tank 2, dependent principally upon ambient conditions and the availability of thermal energy by way of attic space 301 functioning as the solar heat trap of the building. Both storage tanks may store heat or cool, if necessary or desirable.

The compact, modular heat pump system of the present invention is characterized by the utilization of the two basic or primary duct systems within the attic. The first, at 328, houses the direct solar/outside air coil 12 and the second 330, houses indoor air coil 18. The transverse, elongated duct 328 is comprised of a central section 328a, of rectangular cross-section within which coil 12 is mounted. At one end of section 328a, there is provided a blower 332 which, when energized, causes air flow through duct 328 from right to left (FIG. 1). A left section 328b, of reduced size, is connected to the middle or central section 328a at the discharge end of blower 332 and carries a rectangular door or damper 334 which is fitted to a rectangular opening 336 within the top wall of duct section 328b and pivoted about a hinged edge 338 so as to be deflectable to an inclined position, closing off duct section 328b and forcing air to exit into space 301 after passage through coil 12. Alternatively with the damper or door 334 closed, air flow continues within the left section 328b of duct 328. Duct 328 is of U-shaped plan configuration, the left section 328b terminating in an open end 340, at right angles to its opposite end 342 which opens to the discharge of blower 332. A hood 344 covers the open end 340 and is provided with an air discharge grill 346 within the bottom wall, adjacent building end wall 312. A right section 328c of duct 328 is formed as a mirror image of the left section 328b and provided with a door or damper 348, hinged at 350 and fitted to an opening 352 within the top of duct section 328c adjacent end 354 which opens to the central duct section 328a such that the baffle 348 may be inclined to the horizontal, permitting air, which may enter from solar space 301, to pass through opening 352 and flow to coil 12. The opposite end 356 of the right duct section 328c is at right angles to end 354, and terminates at attic end wall 300. A hood 358 is mounted to that end, the hood bearing an air inlet grill 360 within its bottom wall which acts as an outside air inlet to the duct 328 to permit the coil 12 to function, when dampers 334 and 348 are closed and horizontal, to either reject heat to the outside air passing through duct 328 or absorb heat therefrom, depending upon system needs and ambient conditions.

Duct 330 is also rectangular in cross-section and houses, intermediate of ends 362 and 364, the inside air coil 18 through which air passes from left to right. End 362 of the duct 330 is closed while the opposite, discharge end 364, is open. Mounted within the duct adjacent to discharge end 364 is a blower 366 which functions to force air from the duct 330 into distribution duct work indicated generally at 368 and comprised of a longitudinal trunk duct of circular cross-section, as at 370, of somewhat smaller cross-sectional area than that of the duct 330 and permitting distribution of air to the room or space to be conditioned below the ceiling 306 through branch ducts 372 which are also of circular cross-section and which open through the floor 306 of the attic by appropriate circular outlet fittings 374. Upstream of the inside coil 18, the bottom wall of the duct 330 is provided with a rectangular opening as at 376 which carries a room return air grill 378, permitting air to escape upwardly from the space to be conditioned for, flow through the heat exchanger—that is, the inside air coil 18 within that duct—and escape to the interior of the attic forming the solar heat trap through a pivoted door or damper 380 or flow to the outside. The top of the duct is provided with a rectangular opening as at 382, and a damper 380 of rectangular configuration is fitted to the opening 382, and pivoted intermediate of its ends by pivot means 384 for rotation about a horizontal axis between a closed position flush with the top wall of the duct 330, and one inclined thereto so as to block off the grill 378 to the inside air coil 18, thereby forcing the return air from the space 316 to be conditioned, to enter the solar heat trap or attic solar space 301, while the air within that solar space 301 may enter duct 330 and pass through the heat exchange coil 18, with flow induced by operation of the blower 336. Damper 380 could be dispensed with and inside air coil 18 could be isolated from solar space 301. Further, two dampers could be provided to duct 330 at this point, one selectively directing return air to the attic solar space 301 or to inside air coil 18 and the other communicating coil 18 to room return air or to the solar space 301. A pair of communication or bypass ducts are shown at 385 and 386, respectively, the duct 385 being of rectangular cross-sectional configuration and being somewhat smaller in size than duct 328 or 330, and opening at ends 390 and 391 to ducts 328 and 330, respectively. In that respect, the duct 385 is of L-shaped configuration with end 391 opening into the side of duct 330 at its upstream end 362 and adjacent the side of return air grill 378, the other end 390 of duct 385 opening into the side wall of the transverse duct section 328b, downstream of the blower 332 so as to communicate the inlet end of duct 330 to duct 328 downstream of the blower 332 and to air discharge grill 346. Duct 385 carries a damper 394 of rectangular configuration which is mounted for pivoting about a horizontal axis at the center as defined by pivot means 396 and is sized to the interior dimensions of the duct 385 such that, when pivoted to vertical position, it prevents airflow within that duct and permits free flow when pivoted 90° to a horizontal position.

In similar fashion, the duct 330 downstream of the inside air coil 18 is connected to one end 398 of the communication duct 386 which is sized similarly to that of 385, is of rectangular configuration, and which opens into the side of duct 330 adjacent the inlet of blower 366. Specifically, the opposite end 400 of that duct, which is of L-shaped configuration, opens into the side wall of duct section 328c. Duct 386 carries a damper 402 which is rectangular in configuration and sized to the interior of duct 386 and is mounted for pivoting about a horizontal axis at its center by pivot means 404, the door 402 closing off duct 386 when in the vertical position and permitting free passage of air when pivoted 90° to a horizontal position about its pivot axis. Additionally, the end wall 312 of the building attic A is provided with a louvered window 406 comprising a number of parallel and adjacent louvers 408 which are each pivoted for rotation about a horizontal axis and movable between inclined positions which close off the louvered window 406 and horizontal positions permitting air passage through the same. Conventionally, the louvers 408 are weighted so that in the absence of a pressure differential or forced air flow, the louvers will move by gravity to their inclined position as shown closing off the solar trap or interior of the attic A to the outside. Further, in order to selectively control the temperature within the attic due to solar radiation S, the solar window 308 is provided with a light shield or screen 410 which may be slid from right to left to variably close off the glass window 308, thereby preventing direct solar radiation into the interior of the attic.

In the partial schematic illustrations of FIGS. 1-7 inclusive, certain of the dampers or doors are shown in different positions, and as a result of compressor operation, or lack thereof, air flows are created to achieve desired heating and cooling under different ambient conditions. Further, in that regard, schematically, arrows are provided indicating the nature and extent of air flow to and from the building interior and within the same to and from the solar heat trap or attic area and the space or room to be conditioned as at 316, and arrows are provided to indicate thermal energy transfer by way of the manifold system M or interface to and from storage tanks 58 and 60 (if employed) as well as the hydronic heat exchange tank 320 and hot water tank 64. In addition, as described hereinafter, in conjunction with the hydraulic schematic diagram of FIG. 8 for the heat pump system of FIGS. 1-7 inclusive, and by way of the other figures directed to additional embodiments of the invention, there will result a ready appreciation of the novel aspects of the present invention.

By further reference to FIG. 1, it may be appreciated that there is no heat pump operation in this mode; but the outside temperature is such that the residence requires heating of space 316 to be conditioned. In this case, the solar radiation S is significant, and the solar space 301 provided by the attic interior and acting as a solar heat trap is sufficiently warm so that the interior of the residence may be directly heated by circulation of air between the space 301 within the attic and the space 316 to be conditioned within the building proper. The air flow is indicated by the arrows and the air is flowing only within duct 330 and through the inside air coil 18—however, the inside air coil is neither rejecting heat to the air nor absorbing heat from the same. Door or damper 380 is pivoted to inclined position to permit the flow of return air through return air grill 378 into the attic solar space 301, as indicated by arrow 412, where it is heated by direct solar radiation S through the solar window 308; the heated air, indicated by arrow 414, entering the inlet side of coil 18 under forced air circulation by way of energization of blower 366. The heated air is distributed into the interior of the space 316 beneath the attic floor 306 as shown by arrows 416 by way of the distribution trunk and branch ducts 370 and 372. Thus, the return air from the building interior space 316 to be conditioned is being fed back into the solar space zone 301 so as to be directly heated by mixing with the solar space air. This mode will persist only as long as the solar space air is warm enough to directly heat without heat pump amplification. In this mode, there is no heat transfer to and from storage tanks 58 and 60, there is no hydronic heating of the space 316 to be conditioned, nor is energy being supplied to the hot water tank 64 for heating the water W.

Figure 2:
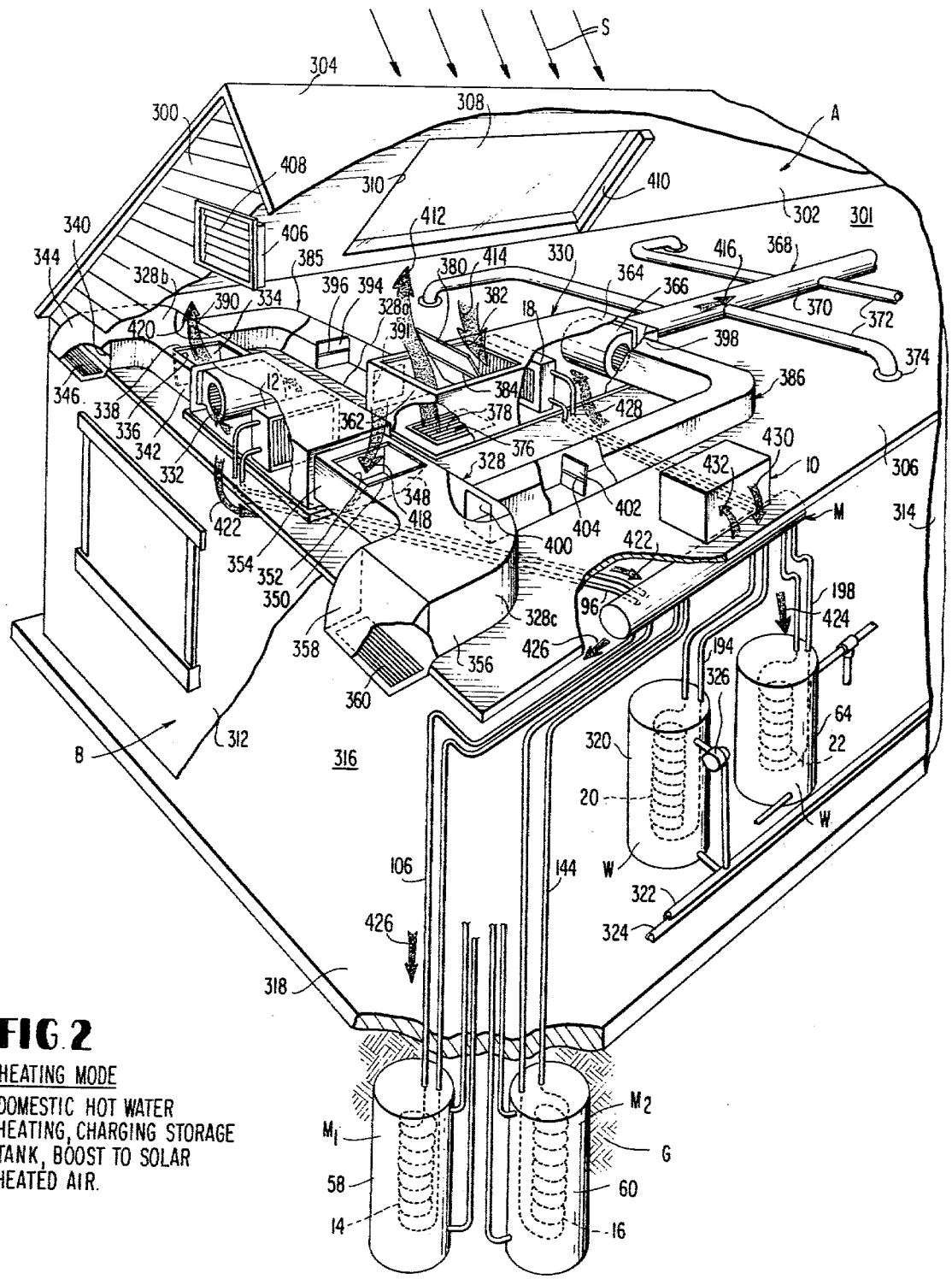
FIG. 2 is a similar partial perspective view and schematic diagram of the heat pump system of FIG. 1 in heat pump heating mode, with heat pump boost to solar heated air, domestic hot water heating and charging of the heat storage tank.

Turning next to FIG. 2, the heat pump system of the present invention is one embodiment is illustrated under conditions in which the heat pump components are operative and the heat pump acts as a boost to the solar heated air, while the heat pump system is actively charging the storage tank 58 and heating the water W within the domestic hot water tank 64. The attic solar/outside air coil 12 is utilizing the solar space 301 air as the thermal energy source to the heat pump. In that regard, the dampers or doors 334 and 348 are inclined from the horizontal and close off the duct 328 to the outside air—that is, from the fresh air grill 360 and the air discharge grill 346. Blower 332 is energized, drawing air into duct central section 328a through the opening 352, the heated air entering the same as indicated by arrow 418 and, upon cooling, discharging back into the solar space or solar heat trap 301 as indicated by arrow 420 after passage through coil 12 under blower operation. Since the solar space air is being heated by solar window 308, heat is being picked up by the refrigerant within the solar/inside air coil 12. In this case, the thermal energy available from the solar space air is sufficient to directly heat the home under some conditions without heat pump amplification. Specifically in FIG. 2, heated air within the solar space 301 passes through the inside air coil 18 but (normally) without heat exchange under operation of the blower 366 and discharges through the trunk duct 368 and the branch supply ducts 372 discharging into the residence space 316 to be conditioned. Further, there is sufficient energy available to heat the water W within the domestic hot water tank, and the thermal energy is delivered from coil 12 to the manifold M or interface as indicated by arrow 422, and manifold supplying thermal energy to the domestic hot water tank as indicated by arrow 424 and specifically by employing coil 22 as a condensor within that tank. Simultaneously, thermal energy due to the high solar radiation S is available to charge a storage tank. In this case, storage tank 58 has its media, which also may be water, heated as indicated schematically by the arrow 426 from the manifold system M or interface to that tank. If necessary, the thermal energy being extracted from the solar space air may act to boost the heated air as indicated by arrow 414 entering duct 330 upstream of coil 18, prior to that air passing through the attic floor 306 at terminals 374 to the space 316 of the residence to be conditioned as indicated by arrows 416. This is indicated schematically by dotted line arrow 428 (FIG. 2) from the manifold system M to that coil. Additionally, although not illustrated, instead of or in addition to thermal energy being directed to storage coil 14 of the storage tank 58, heat could be stored within tank 60. Refrigerant is pumped to and from the various coils via compression module 10 by way of manifold system M as per arrows 430 and 432.

Figure 3:
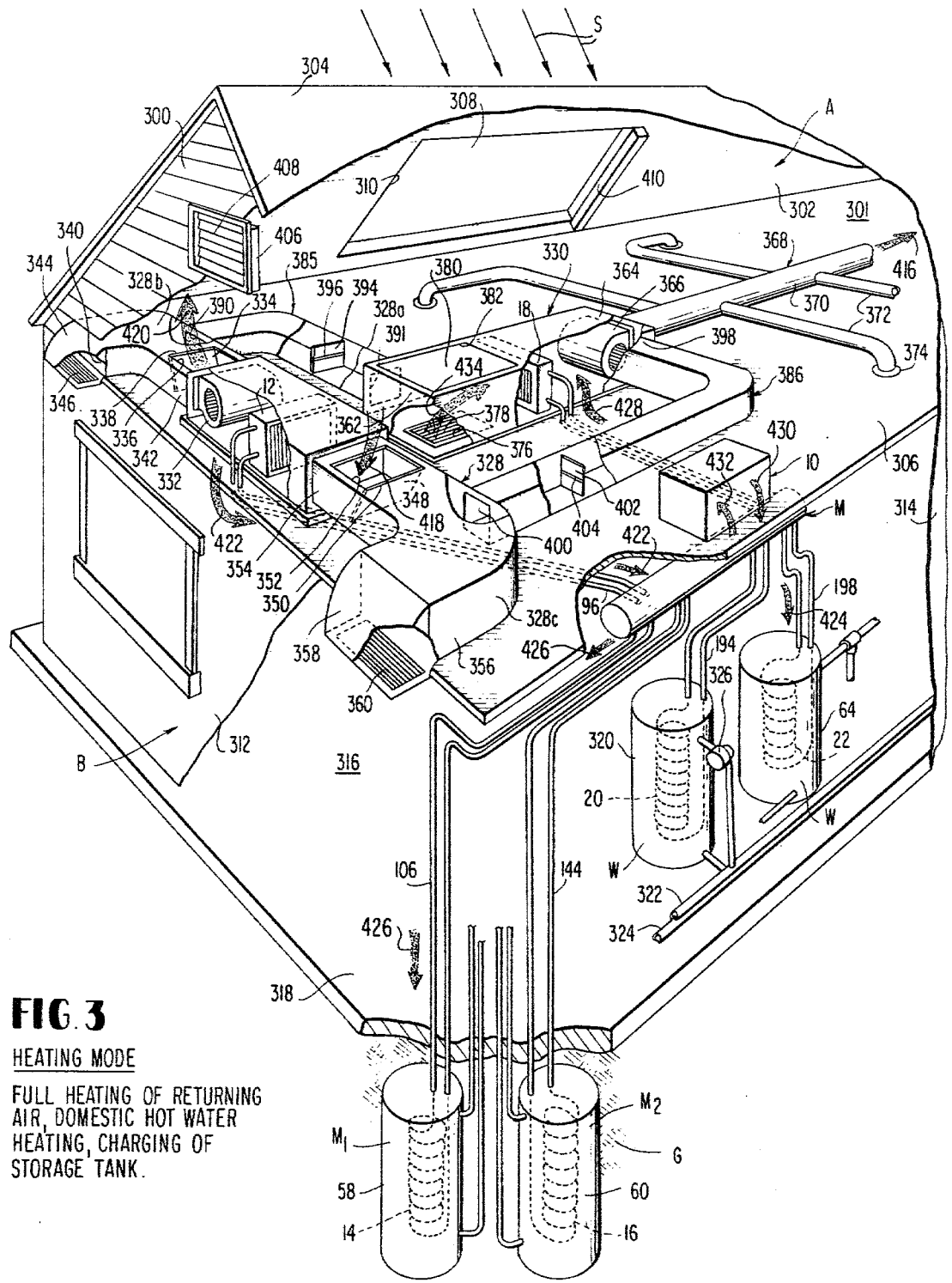
FIG. 3 is a partial perspective view and partial schematic diagram of the heat pump system of FIG. 1 operating under heat pump heating mode with domestic hot water heating, charging of the heat storage tank and full heating of the conditioned space return air.

Turning to FIG. 3, the residential heat pump system is shown in operation under heating mode in which the inside air coil functions to fully heat the air returning from the space 316 to be conditioned—that is, passing through the return air grill 378, entering duct 330 and passing through the inside air coil 18 under operation of blower 366. This air again discharges back into the space to be conditioned through openings within the attic floor 306 as provided by fittings 374 at the ends of the branch supply ducts. Return air does not enter the solar space 301 but, as indicated by arrow 434, is prevented from exiting to that space by the movement of the door 380 to full horizontal position closing off opening 382. The air, after heating, passes into the space 316 to be conditioned in the same manner as previously indicated. Solar radiation S enters the solar space 301 to heat the air therein, and the coil 12 functions in like manner to FIG. 2 to pick up heat from the air by circulation of air through the coil 12 and within duct 328 as evidenced by arrows 418 and 420. Heat pump heating of coil 18 is indicated by arrow 428. Further, by reference to the schematic portion of the figure, domestic hot water heating occurs as indicated by arrow 424, thermal energy passing from the coil 12 to coil 22 of that under under heat pump operation to be described in detail hereinafter with reference to FIG. 8, while the heat storage tank 58 receives thermal energy as indicated by arrow 426, thus charging thermal energy within that storage tank. Under these conditions, the solar space 301 air is now at or below return air temperature from the space 318 of the residence to be conditioned as per arrow 434, and, therefore, the inside air coil damper or door 380 is closed. Dampers 334 and 438 remain open and attic air is circulated through the solar/inside air 12 to extract heat for room air, storage and hot water heating.

Figure 4:
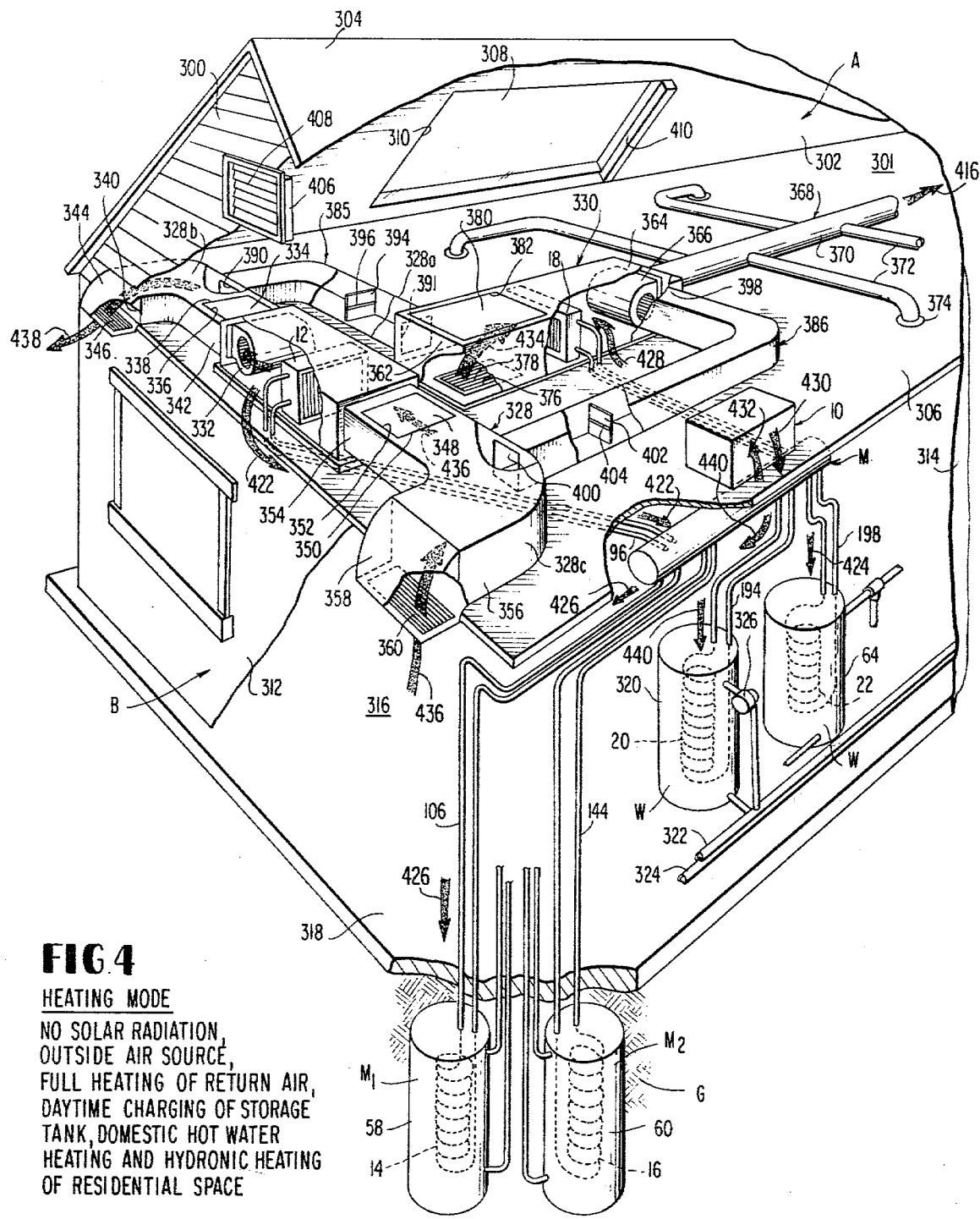
FIG. 4 is a partial perspective view and partial schematic diagram of the heat pump system of FIG. 1, operating under heat pump heating mode with full heating of conditioned space return air, daytime charging of the heat storage tank and domestic hot water heating.

Due to a lack of solar radiation or for other reasons, the solar space 301 air may be no longer higher in temperature than the outside ambient air. Under such conditions, FIG. 4, and in difference to the operation as per FIG. 3, the dampers or doors 334 and 348 for duct 328 are closed, blocking the openings 336 and 352, respectively, to the solar space 301, forcing air circulation through coil 12 from the exterior of the building. Specifically under operation of blower 332, air is forced to enter the fresh air grill 360 as per arrow 436 and to exit from the outside air discharge grill 346 as per arrow 438. Therefore, the outside ambient air feeds thermal energy via the solar source/outside air coil 12 to the system, and the chilled air returns to the outside environment. In fact, the air within the solar space 301 is cut off to the coils of the heat pump system and from the space 316 to be conditioned within the building. As such, the inside air coil 18 receiving heat as per arrow 429 heats the return air, as per arrow 434, entering from the space to be conditioned through return grill 378 under blower operation 366 and distributes heated air back to the space 316 to be conditioned. All heat pump functions are still available; yet under most situations, charging of the heat storage tank 58 will occur during daytime hours only, as the outside temperature of the air is normally higher during the day than it is at night. In other words, if a long cloudy spell is encountered, the daytime temperatures would still be normally above the nighttime temperatures, and, therefore, the solar energy available to supply the needs during the daytime is substantially higher than that at night. Thermal energy may be stored for nighttime use by the heat pump system when the outside temperature is considerably lower. In the illustration of FIG. 4, the solar energy pickup is insufficient to where the solar space 301 air can be used as a heat source. With the storage tank 58 being used as the heat source for the heat pump system during the evening hours with significant drop of outside air temperature, this overcomes the problem where the reduced heating COP (coefficient of performance) would occur if outside air was continued as the source of thermal energy of the heat pump system. Also under the illustrated system, the outside air and the storage tank 58 may be used simultaneously as sources of heat, in which case, as will be seen hereinafter, thermal energy is fed into the compressor of compressor 11 of compression module 10 at different pressure levels corresponding to the different temperature levels of the respective sources. In addition to full heating of the return air through return grill 378 by way of inside air coil 18 functioning as a system condenser, the system additionally extracts thermal energy from coil 12 as per arrow 422, and through the utilization of the interface provided by the manifold system M, to effect daytime charging of the heat storage tank 58 as per arrow 426, heating of the water W within the hot water tank 64 as indicated by arrow 424, and, in addition, since the system is operating under relatively low ambient temperature conditions, additional heating of the space 316 of the residence by way of the hydronic baseboard water loop and baseboard heaters 322 through the utilization of coil 20 as one of the system condensers with heat input to hydronic tank 320 as per arrow 440.

Figure 5:
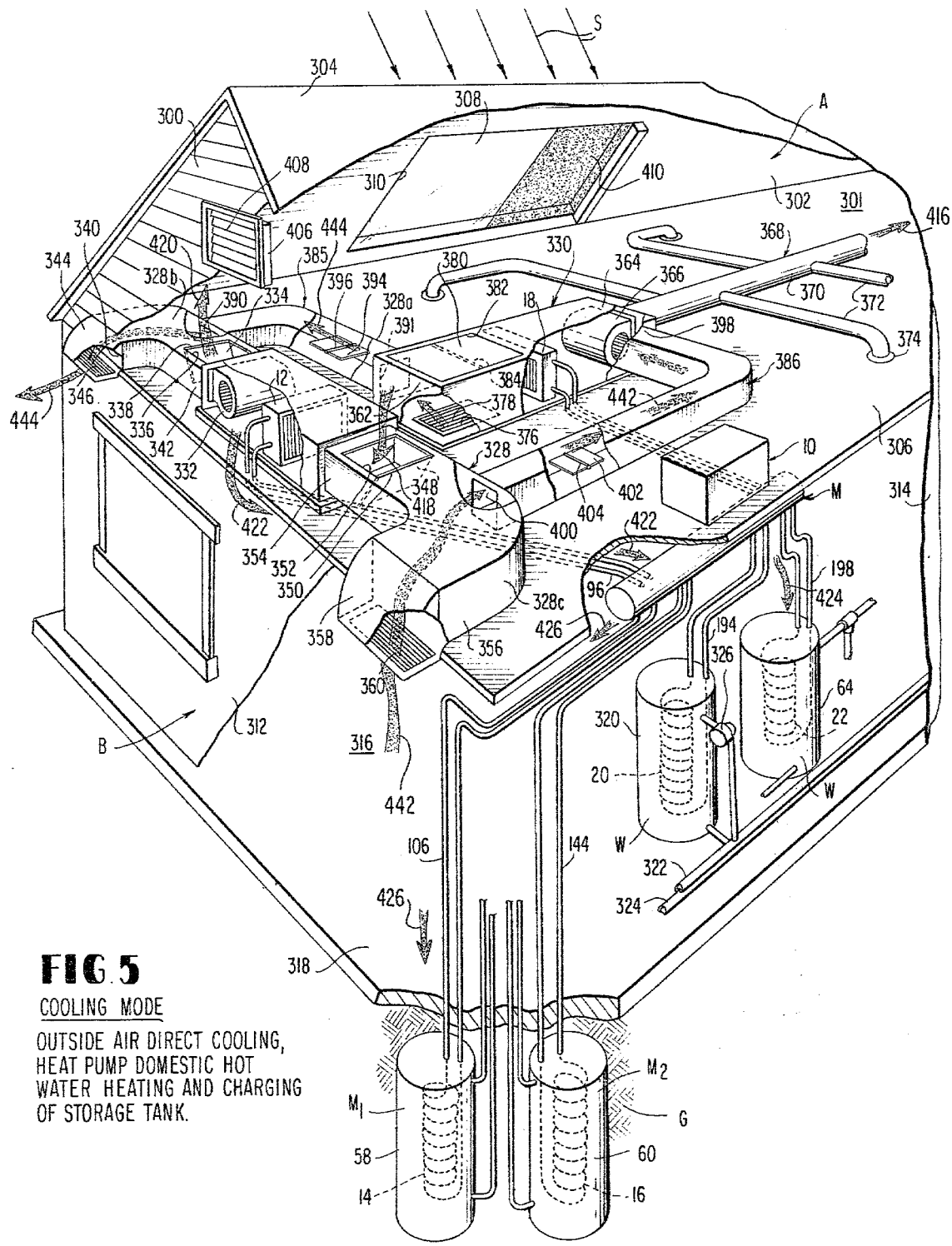
FIG. 5 is a partial perspective view and partial schematic diagram of the heat pump system of FIG. 1 under heat pump cooling mode with domestic hot water heating and charging of the heat storage tank.

The heat pump system acts with equal efficiency under various cooling modes. FIG. 5 illustrates a typical cooling mode, under conditions in which the solar radiation S is partially cut off by the opaque solar screen or shield 410, thus reducing the size of the solar aperture provided by the glass window 308. In this case, cooling under some conditions can be accomplished by the direct utilization of outside air without the inside air coil being involved, even though the heat pump is in operation and evaporating coil 12 is functioning to absorb heat from the solar space 301 air within the attic. The outside air enters the space 316 to be conditioned directly as indicated by arrow 442 passing through the fresh air inlet grill 360 and entering section 328c of duct 328. However, since damper or door 348 is inclined from the horizontal, it blocks off air flow from section 328c of duct 328 to the center section 328a of that duct. Further, since the damper or door 402 is pivoted about its axis 404 to horizontal position, virtually unimpeded fresh air flow is permitted to flow within bypass duct 386 where, by operation of the blower 364, this air is caused to discharge directly into the building interior and specifically the space 316 to be conditioned; that space being cooled by the cool fresh air emanating from outside the building. The return air flow through the return air grill 378 is discharged to the outside of the building as per arrow 444, this air passing through the communication duct 385 to the air discharge grill 346 by entry into section 328b of duct 328, which section is closed off to the discharge of blower 332 by the pivoted and essentially inclined position of damper or door 334. Flow is permitted through the communication duct 385 by rotation of the damper or door 394 from vertical to horizontal position and in line with air flow. The damper 380 remains horizontal and closed, closing off opening 382 to the solar space 301. However, the hot air within that space passes as per arrow 418 into the central duct section 328a and through coil 12 and exits through opening 336 within the duct section 328b—that is, back into the solar space 301, arrow 420, for reheating by solar radiation S through the solar window 38 whose aperture has been reduced by the screen 410. Thus, the attic solar/outside air coil 12 is receiving heated attic air, and the heat received thereby is available for charging of the hot storage tank 58 and for heating the water W within the domestic hot water tank 64. Thermal energy is delivered to the manifold system or interface M as per arrow 422 from coil 12 functioning as a system evaporator, This heat is delivered to the storage tank as per arrow 426 for heating the media of that tank, and delivered to the domestic hot water tank 64 for heating of water W as per arrow 424. There is no room heating requirements so the hydronic tank 320 is cut off to the supply of heat. Coils 14 and 22 functioning as condensers for tanks 58 and 64 may be operating at different condensing temperatures, depending on the temperature of the media within those tanks.

Figure 6:
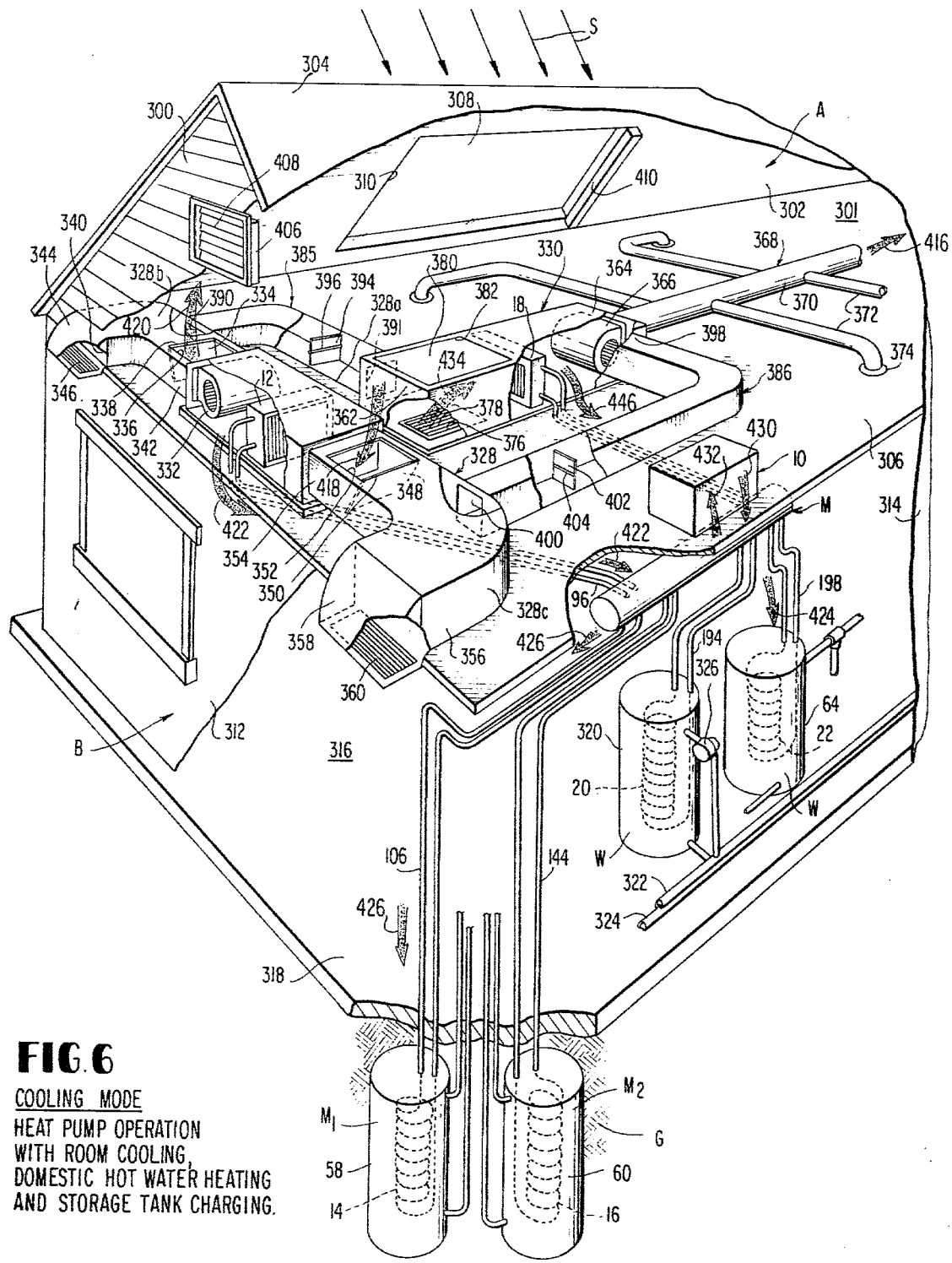
FIG. 6 is a partial perspective view and partial schematic diagram of the heat pump system of FIG. 1 under heat pump cooling mode with heating of the domestic hot water tank, charging of the heat storage tank and cooling of the conditioned space air.
Figure 7:
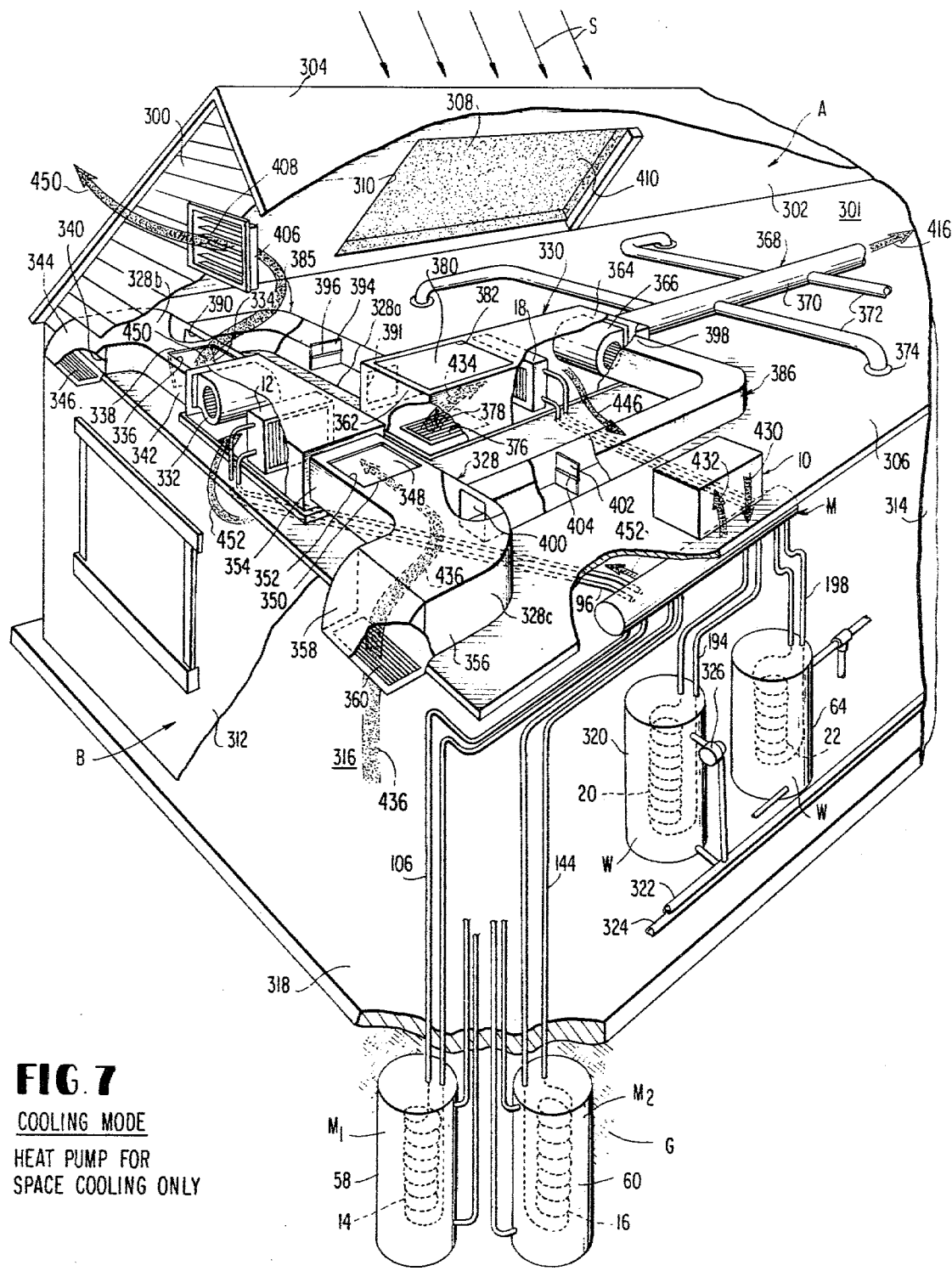
FIG. 7 is a partial perspective view and partial schematic diagram of the heat pump system of FIG. 1 under heat pump cooling mode with heat pump cooling of the conditioned space only.

FIG. 6 shows the system in operation where cooling of the return air from the space 316 to be conditioned is required for cooling of the residence, the return air as per arrow 434 passing into duct 330 upstream of the inside air coil 18 through return air grill 378, damper 380 is horizontal and opening 382 of duct 332 to the solar space 301 is closed. The air after being cooled by coil 18 functioning as an evaporator coil is forced back to the space 316 by flow, arrows 416, through the attic floor 306 at fittings 374 under operation of the blower 364. The outside air is too warm to be used for direct cooling, and the system is now operating under a cooling mode in conventional heat pump fashion, in which the heat is absorbed from the air flow circulating to the space 316 to be conditioned and is employed to heat the domestic hot water tank as per arrow 424, with coil 22 functioning as the system high-pressure condenser. The temperature within the solar space 301 is quite high, there being full solar radiation S through the solar window 308. This thermal energy is picked up by the solar/outside air coil 312 and directed to the manifold system M arrow 422, and, thence, via compression module, arrows 430 and 432, to the various coils functioning as condensers, in this case, the coil 22 for heating the hot water W within tank 64 and coil 14 functioning to heat the storage media within heat storage tank 58 as per arrow 426. Additionally, heat extracted by coil 18 passes to the system as per arrow 446. The vapor generated at the solar source/outside air coil 12 is considerably higher in pressure than the vapor generated within the inside air coil 18 functioning to cool the space 316 to be conditioned, and, thus, vapor generated at these different pressure levels is fed back as per arrows 422 and 446, respectively, via manifold system M, to the compression module 10 and the compressor 11 which properly accepts the vapors at the different pressure levels. The discharge of the compressor is then utilized for domestic hot water heating and charging of the hot storage tank 58, with these functions being carried out simultaneously, the compressor discharge again being effected at different pressure levels automatically to meet the condensing temperature conditions for coils 14 and 22 within tanks 58 and 64, respectively. If the compression module comprises a single-stage reciprocating compressor, it is operating under these conditions at four different pressure levels. Additionally, as will be evidenced hereinafter, a fifth pressure may also be encountered due to, at least in one embodiment, the utilization of a flash enconomizer system to favorably affect system efficiency.

Referring next to FIG. 7, again, the system is illustrated with the heat pump in cooling mode. The domestic hot water is heated to its desired extent, for instance, on the order of 120° F., the ambient temperature is high as for instance during the summer, the temperature media of the hot storage tank 58 is equal to or greater than the outside air temperature, and the solar space 301 air temperature exceeds 120° F. The heat pump system is operating for cooling of the building space 316 air, in which case, the solar source/outside air coil 12 is functioning to dissipate the thermal energy which is being extracted from the space 316 to be conditioned within the residence by the utilization of the inside air coil 18 as the system evaporator. In this respect, the heat must be dissipated externally of the building and attic A, the solar aperture provided by the solar window 308 is completely closed, by the screen 410 covering the window. The door or damper 380 is in horizontal position, closing off the opening 382 of duct 330 to the solar space 301. The return air from the space 316 being conditioned within the residence passes through coil 18 as per arrow 434 where its heat is extracted, and the cooler air returns, arrows 416, to the space 316 through outlets 374 within the attic floor 306 under operation of the blower 364. The refrigerant, after picking up heat at coil 18, returns to the suction side of the compression module 10 arrow 446 by way of the manifold system M. The only coil functioning as a condensor within the system is coil 12 as indicated by arrow 452 where that heat is rejected into the solar space 301 or attic interior. The outside air, which is quite hot, enters duct section 328c through the fresh air inlet grill 360 arrow 436 and passes to the coil 12 under suction by way of operation of blower 332, the damper or door 348 being horizontal and closing off opening 352 to the attic solar space 301. The hot air picks up additional heat at coil 12 and discharges into the attic interior through opening 336 due to the inclined or near vertical position of the damper or door 334. The discharge of this air under pressure into the attic solar space 301, arrow 450, forces the louvers 408 of window 406 to open against gravity to automatically ventilate the heated air from the attic so that excessive attic temperatures are not encountered. The mode of FIG. 7 will occur only during peak summer months and where a net energy rejection is absolutely required. However, under most cases, due to system needs such as hot water heating, the heat extracted by coil 18 may be advantageously employed elsewhere within the system for useful heating effect.

Referring next to FIG. 8, there is shown in schematic form the embodiment of the invention in accordance with FIGS. 1-7 inclusive as employed primarily in controlling the temperature of space 316 to be conditioned of a building B. Schematically, the building B is sectioned by partition 62a so as to define to the right tank 320 housing water W' with the hydronic coil 20 immersed therein. Further, in the schematic diagram, the hot water tank 64 is in fact incorporated within building B and spaced from hydronic tank 320. As mentioned previously, additional primary components of the heat pump system comprise the compression module 10, in this case, formed of a compressor indicated at 11 and an accumulator 15 separated from the compressor by way of partition 10b as well as the direct solar/outside air coil 12, storage coil 14 borne by the number one storage tank 58, and storage coil 16 borne by the number two storage tank 60, tank 58 bearing media $M_1$ and tank 60 bearing $M_2$. Defining the manifold system, indicated generally at M, of FIGS. 1-7 are four basic fluid manifolds: a discharge manifold 28, a suction manifold 30, a liquid feed manifold 32 and a liquid drain manifold 34. Additional components of the heat pump system in this embodiment comprise six seal pots as at 36, 37, 228, 164, 230 and 232 for controlled flow of a condensed refrigerant when any one of the coils 12, 14, 16, 18, 20 and 22 respective thereto are functioning as system condensers to facilitate the flow of condensed refrigerant R to a receiver 26 which also forms a prime component of the system.

Further, the system includes a number of solenoid operated control valves $V_1$–$V_{20}$ inclusive and check valves $C_1$–$C_{15}$ inclusive. The solenoid operated control valves are of the normally closed when de-energized type and control refrigerant flow in either liquid or vapor form to and from the coils 12, 14, 16, 18, 20, 22 and 51, as well as the receiver 26 and a compressor 11 of the compression module 10. The check valves function to prevent flow in one direction but permit the flow in the other within the conduit means or piping forming the closed loop heat pump refrigeration circuit.

In the schematic circuit diagram of FIG. 8, using the compression module 10 as initial basis of reference, the compression module comprises the compressor 11 and an accumulator 15, in this embodiment. The compressor is provided with a discharge port 46 and a suction port 44. The compressor 11 is assumed to be a helical screw rotary compressor although it may take the form of a multiple cylinder, stepped and/or stages reciprocating compressor. The helical screw rotary compressor 11 of the illustrated embodiment is provided with a compression chamber 17, a pair of intermediate pressure refrigerant vapor injection ports 50 and 55; and ejection ports 48 and 56, which permit refrigerant, compressed to an intermediate pressure between suction and full discharge, to be discharged from the compression module 10 for use by coils functioning as intermediate pressure condensers. The refrigerant vapor injection port 50 may function to receive refrigerant vapor from a coil or coils functioning as intermediate pressure evaporator coils within the system, while the second injection port 55 is illustrated as connected to the receiver 26 for permitting vaporized intermediate pressure refrigerant vapor returning from the receiver through a hold-back valve 2 to feed to the compressor 11 at a point within the compression process which is above the pressure of the suction port 44 but below the pressure at discharge port 46.

In the manner of prior patent applications referred to above of which this is a continuation-in-part, importantly, the present invention employs modular concepts in a heat pump-type refrigeration system wherein, preferably, the helical screw rotary compressor compression module or, in the alternative, a multicylinder reciprocating compressor compression module may be interchangeably employed, each having multi-level pressure capabilities. However, regardless of the nature or makeup of the compressor itself, the compression module 10 may be connected to any number of coils by way of the four primary manifolds, comprising the discharge manifold 28, suction manifold 30, liquid feed manifold 32 and liquid drain manifold 34. The compressor discharge port 46 is connected to the discharge manifold 28 by line 66. The suction manifold 30 connects indirectly to the suction port 44 by the compressor by way of line 68, which first passes to an accumulator 15 of compression module 10 opening to the interior of that element and permitting the refrigerant vapor to contact accumulator coil 51 and to be fully vaporized by subcooling refrigerant in liquid form within the accumulator coil 51, which is directed to the accumulator from the receiver 26 prior to passing to the liquid feed manifold 32. Line 68 connects to the accumulator 15 via inlet port 45, and the refrigerant in assured vapor form leaves the accumulator 15 via outlet port 47 and passes to the compressor suction port 44 via line 68'. Port 53 of the compression module 10 permits connection between the accumulator coil 51 at its inlet side to the receiver 26 by way of line 76. A port 52 of the compression module 10 connects the outlet side of the accumulator coil 51 to line 70, which connects to liquid feed manifold 32 at point 72. The liquid drain manifold which receives the liquid refrigerant from the various coils functioning as condensers within the system, connects to the receiver by way of line 74.

In the embodiment of the invention shown in FIG. 8, and operating in accordance with the showings of FIGS. 1–7 inclusive, depending upon mode, ambient temperature and needs, it is important that the pressure in the receiver be set by the utilization of the hold-back valve Z as at 240 to feed expanded vapor resulting from flash cooling of the refrigerant R of receiver 26 by use of the float control valves F of the various seal plots 36, 37, 228, 40, 230 and 232, from left to right (FIG. 8) to maintain the liquid refrigerant within the receiver at a value slightly higher than the highest evaporator pressure of any of the coils 12, 14, 16, 18 and 20 functioning as system evaporators. This intermediate pressure is maintained through the use of a line 238 which connects to the line 226 carrying the hold-back valve 240 upstream of that valve element and between the hold-back valve and the receiver such that the hold-back valve Z opens when the differential between the receiver pressure and that of line 226 leading to injection port 55 of the compressor 11 exceeds the preset adjustment of hold-back valve Z. Liquid cooling is accomplished by flashing within the receiver, and this occurs in the liquid drain manifold lines as well as the receiver shell itself. Vapor is generated which is at a pre-determined pressure value above the injection port pressure, and, thus, all of the basic advantages accruing from injection-type subcooling are maintained. Obviously, the preset differential is maintained as low as practical, yet it guarantees adequate liquid feeding of the system evaporators from the liquid feed manifold 32. The accumulator 15 is not absolutely necessary for an operating system, and the receiver 26 could communicate directly to the liquid feed manifold by connection of line 76 to the liquid feed manifold 32 at point 72. In the case as in the instant embodiment of the invention, where the compressor 11 constitutes a helical screw rotary compressor and where the injection port 55 is carried by a gas injection slide valve, the receiver pressure relative to the highest evaporating pressure may be easily controlled by positioning of the gas injection slide valve itself. That is, if the receiver pressure drops too low relative to the highest evaporating pressure, the gas injection slide valve is simply moved automatically closer to the discharge side of the helical screw compressor (closer to the discharge port 46), thus causing the receiver pressure of receiver 26 to automatically rise until balance is achieved. In this arrangement, while seal pots are required and are employed with the high side floats F, this arrangement eliminates the necessity for positive displacement pumps between the seal pots and the liquid drain manifold and their attendant bypass line as employed in prior cited applications.

In that regard, the manner in which the various coils 12, 14, 16, 18 and 22 are connected within the closed-loop refrigeration system, and controlled flow of refrigerant is achieved to and from those coils to permit them to function as condensers or evaporators may be seen by further reference to FIG. 8. Line 82 leads from the discharge manifold 28 at point 83 to the direct, solar/outside air coil 12 and bears solenoid operated control valve $V_2$ for controlling the feed of compressed refrigerant vapor to coil 12 when it functions as a high-pressure condenser. Line 82 connects to coil 12 at point 84. Line 88 connects to coil 12 at 86 and to the liquid drain manifold 34 at point 90 and bears seal pot 36 and check valve $C_7$. Further, line 94 connects to the liquid feed manifold 32 at point 96 and to the outside air coil at point 86, that line bearing solenoid operated control valve $V_{15}$ for permitting condensed refrigerant to flow to the direct solar/outside air coil 12 when it functions as an evaporator. In that respect, each of the coils 12, 14, 16, 18 and 20 are provided with restriction means or suitable expansion valves (not shown) to permit the coils to function as evaporators under pressure reduction. Refrigerant return to the suction side of the compressor 11 is normally achieved through line 96 which connects to line 82 at point 85 and to the suction manifold 30 at point 98, this line bearing solenoid operated control valve $V_1$ and check valve $C_1$. Refrigerant vapor partially compressed by the compressor 11 may be directed through ejection port 48 and line 124 to the direct solar/outside air coil 12 by way of solenoid operated control valve $V_{13}$ and check valve $C_2$ to permit that coil to function as an intermediate-pressure condenser relative to another coil within the system functioning as a higher pressure condenser. With respect to storage coil 14 for storage tank 58 bearing media $M_1$, line 100 connects to the discharge manifold 28 at point 102 and connects to line 106 bearing coil 14 at point 104. The storage coil 14 connects on its opposite side at point 110 to the liquid drain manifold 34 by way of line 112 at point 114 and connects, additionally, by way of line 116 to the liquid feed manifold 32 at point 118. Line 112 carries the seal pot 37 and check valve $C_8$, while line 116 bears solenoid operated control valve $V_{16}$. Line 100 includes solenoid operated control valve $V_5$ such that coil 14 functions as a high-pressure condenser when solenoid operated control valve $V_5$ is open with the condensed refrigerant returning through the seal pot 37 and check valve $C_8$ via line 112 to the liquid drain manifold 34. Alternatively, coil 14 may function as an evaporator coil, in which case, solenoid operated control valve $V_{16}$ is energized. Refrigerant vapor normally returns to the suction manifold 30 via line 120 at 122, which line connects at point 104 to line 106. Line 120 includes solenoid operated control valve $V_3$ and check valve $C_3$. Intermediate-pressure refrigerant vapor can be provided by the compressor 11 via ejection port 48 and line 124 to storage coil 14 through a line 128 which branches from line 124 at point 126 and connects to line 106 at point 131, line 128 including solenoid operated control valve $V_4$ and check valve $C_4$. Further, when coil 14 functions as an intermediate-pressure evaporator coil, the vapor is returned to the compression module at intermediate pressure by way of vapor injection port 50 through line 130 which connects to line 106 at point 108, that line bearing solenoid operated control valve $V_{14}$ and check valve $C_{11}$. With respect to the second storage coil 16 and storage tank 60, that coil is purposely illustrated as the low-pressure evaporator coil or as the high-pressure condensing coil when in its evaporator and condensing modes, respectively, although it may have identical intermediate-pressure connections to coil 14 for both supplying refrigerant vapor thereto at intermediate pressure to permit the coil 16 to function as an intermediate-pressure condenser or to receive intermediate-pressure vapor therefrom for return to the compressor by way of an intermediate-pressure injection port when functioning in evaporator fashion by way of branch connections with respect to lines 124 and 130. However, as shown, coil 16 connects to the discharge manifold 28 by way of line 148 at 150, which line bears solenoid operated control valve $V_7$ and connects to the liquid feed manifold 32 through line 138. Line 138 connects to that manifold at point 140 and to one side of the coil 16 at 136 and bears check valve $C_9$. When performing as an evaporator, refrigerant is delivered from the liquid feed manifold 32 by way of a line 132 which connects to the manifold 32 at 134 and which connects to coil 16 at point 136. The line 138 includes seal pot 228 and check valve $C_9$. Vapor return to the suction manifold 30 is achieved by a line 144 which connects to coil 16 at point 142 and to the suction manifold at point 146, line 144 including solenoid operated control valve $V_6$ and check valve $C_5$. Line 132 carries solenoid operated control valve $V_{17}$.

The inside air coil 18, which functions to heat or cool by airflow heat exchange action the space to be conditioned 316 within building B, connects to the discharge manifold 28 at point 154 through line 152, which line bears solenoid operated control valve $V_9$. On the opposite side of coil 18, line 164 connects to the liquid drain manifold 34 at point 166 and to coil 18 at point 162, that line bearing seal pot 40 and check valve $C_{10}$, this permitting the coil 18 to function as a high-pressure condenser. Alternatively, line 172 which connects to the liquid feed manifold 32 at point 174 and to coil 18 at point 162 and which bears solenoid operated control valve $V_{19}$ permits the inside air coil 18 to function as an evaporator with vapor return to the suction manifold 30 by way of line 156 which connects to inside coil 18 at point 160 and to the suction manifold 30 at point 176. Line 156 includes check valve $C_{14}$ and solenoid operated control valve $V_{10}$. In order to permit the inside air coil 18 to function as a intermediate-pressure condenser, a line 170 leads from the ejection port 56 to coil 18, connecting to that coil at point 158 and bearing solenoid operated control valve $V_8$ and check valve $C_6$. This permits intermediate pressure flow from the compressor but prevents flow back to the compressor through line 170.

The hydronic coil 20 borne by hydronic tank 320 connects to the discharge manifold 28 via line 178 at point 180, which line bears solenoid operated control valve $V_{11}$, permitting the coil 20 to function as a condenser for heating the water W' within that coil and the base board heating loop comprised of conduits 322 and 324. Condensed refrigerant flows to the liquid drain manifold through high side float equipped seal pot 230, via line 186 which connects to the liquid drain manifold at point 188, downstream of check valve $C_{12}$, and to coil 20 at point 184. Line 190, which opens to the liquid feed manifold 32 at point 192, connects to coil 20 at point 184 and bears solenoid operated control valve $V_{20}$, permitting coil 20 to function as an evaporator under conditions requiring cooling of the building interior—that is, space 316 to be conditioned by hydronic means—in addition to inside air coil 18. In that case, refrigerant in vapor form returns to the suction manifold 30 through line 194 by way of connection points 182 and 196, with the line 194 bearing solenoid operated control valve $V_{12}$ and check valve $C_{15}$.

The hot water coil 22 within tank 64, which is provided within building B, is connected on one side by way of line 198 to the discharge manifold 28 at point 200, this line bearing solenoid operated control valve $V_{13}$, while on its opposite side, it connects by way of line 202 to the liquid drain manifold 34 at point 204, line 202 including the seal pot 232 and check valve $C_{13}$.

While the operation of the system hydraulically illustrated in FIG. 8 and schematically shown in FIGS. 1–7 inclusive may be readily evident from the above description and by additional reference to application Ser. No. 924,015, entitled "Integrated Thermal Solar Heat Pump System," FIG. 8 is shown under the mode of operation of FIG. 5 wherein the building space 316 to be conditioned is cooled not by way of the heat pump but, rather, simply by way of energization of blower 364 to induce the cooler outside air to enter the room with the room air rejected to the outside as per arrows 438 and 444, FIG. 5. In that regard, domestic hot water heating occurs as well as the charging of storage tank 58. Heat is derived from the heat trap or attic interior 301 In that respect, the direct solar/outside air coil 12 is functioning as system evaporator, thus directing heat to the manifold system M, while heat is being supplied to the tank 58 for storage of heat through coil 14 functioning as a condenser (in this case, an intermediate-pressure condenser), while additional heat is being supplied to the hot water coil 22 for heating domestic water W, with coil 22 functioning as the system high-pressure condenser. Solenoid operated control valves $V_1$, $V_4$, $V_{13}$ and $V_{15}$ are energized and open, while solenoid operated control valves $V_2$, $V_3$, $V_5$–$V_{12}$ inclusive, $V_{14}$ and $V_{16}$–$V_{20}$ are de-energized and closed. The compressor 11 discharges compressed vapor at a discharge pressure level which is higher than that of the intermediate pressure ejection port 48, and the vapor being supplied to the discharge manifold 28 from the compressor discharge port 46 flows only to the coil 22 functioning as the system high-pressure condenser with the water temperature W within tank 64 being on the order of 120° F. This condensed refrigerant in liquid form returns through the seal pot 232 and check valve $c_{13}$ to the receiver 26 with solenoid operated control valve $V_{13}$ energized. The vapor discharged from the compressor 11 at intermediate pressure by way of ejection port 48 passes through lines 124 and 128 to the storage coil 14 functioning as the system intermediate-pressure condenser, with solenoid operated control valve $V_4$ energized, the condensed refrigerant within the seal pot 37 being permitted to flash and return to the receiver via the liquid drain manifold 34, with the hold-back valve Z functioning to maintain the receiver pressure above that required to feed liquid refrigerant from the receiver through the accumulator 15 to the coil functioning as the system highest pressure evaporator coil. In this case, the outside air coil 12 is the only operating evaporator in the sytem. The vapor returns from coil 12 by way of suction manifold 30 and lines 68 and 68' entering the compressor at suction port 44. Subcooling occurs by flash vaporization within the receiver 26, and the vapor from that element returns to the intermediate-pressure injection port 55 for compressor 11, controlled by the hold-back valve Z. There is no necessity for supplying heat or cool to the space 316 to be conditioned for building B, and the inside air coil 18 and the hydronic coil 20 are not functioning in heat change, nor is storage coil 16 in use.

As in all of the illustrated embodiments in this application as well as the referred to applications, the solenoid operated control valves function in response to system temperature and/or pressure parameters as determined by thermostats at various locations or other sensors which feed sensor signals to a control panel (not shown) which, in turn, supplies appropriate voltage control signals to the various solenoid operated control valves $V_1$–$V_{20}$ inclusive to achieve desired system operation depending upon system needs and ambient and building internal temperature conditions. As mentioned previously, a line such as line 130 could be provided for storage coil 16 to permit that coil to function as an intermediate-pressure evaporator should the temperature of the medium M2 be higher than the saturation temperature of direct solar/outside air coil 12, in this case, as defined by the solar space 301. Further, the outside air coil 12 may be provided with a further line functioning similar to line 130 and connecting to either one of the intermediate-pressure injection ports 50 or 55 of the compressor 11. Further, a single injection and ejection port could be employed in lieu of the dual injection ports 50 and 55 and the ejection ports 48 and 56 of the helical screw rotary compressor 11 forming a part of compression module 10. Further with respect to the circuit of FIG. 8, it should be apparent that the direct solar/outside air coil, in addition to being positioned within the duct 332 as at 12, and with dampers appropriately provided within that duct work to permit the coil to see either the attic solar space 301 or, alternatively, the exterior of the building and utilize ambient temperature for either heat source or heat sink purposes, it is possible that this coil could receive air directly from airtight heat collectors mounted externally of the attic on the roof side facing solar radiation S rather than utilizing the entire attic air as a passive thermal energy heat trap. Further, by the utilization of two separate storage coils, it is obvious that these coils can function to store heat or cool or, simultaneously, one could store heat and the other cool. Thus, in the winter, both storage coils 14 and 16 could be driven in the hot mode --that is, accept heat and store the same-- while in summer, one of the tanks, such as tank 58, could function as a heat storage tank while the other tank 60 functions as a cold storage tank, with coil 14 acting as a system condenser and coil 16 functioning as a system evaporator. At night, energy collected in the cold storage tank 60 could be pumped to tank 58 for subsequent domestic hot water heating purposes during the next day, with the thermal energy then directed from tank 58 by way of coil 14 functioning as an evaporator to the hot water coil 22 functioning as a condenser for heating the hot water W within tank 64. In spring and fall, tank 58 could function as the heat storage tank, while tank 60 could flywheel --that is, it would not be computer driven to certain temperature but would flywheel on demand to accept heat or cold as required by the system.

Figure 9:
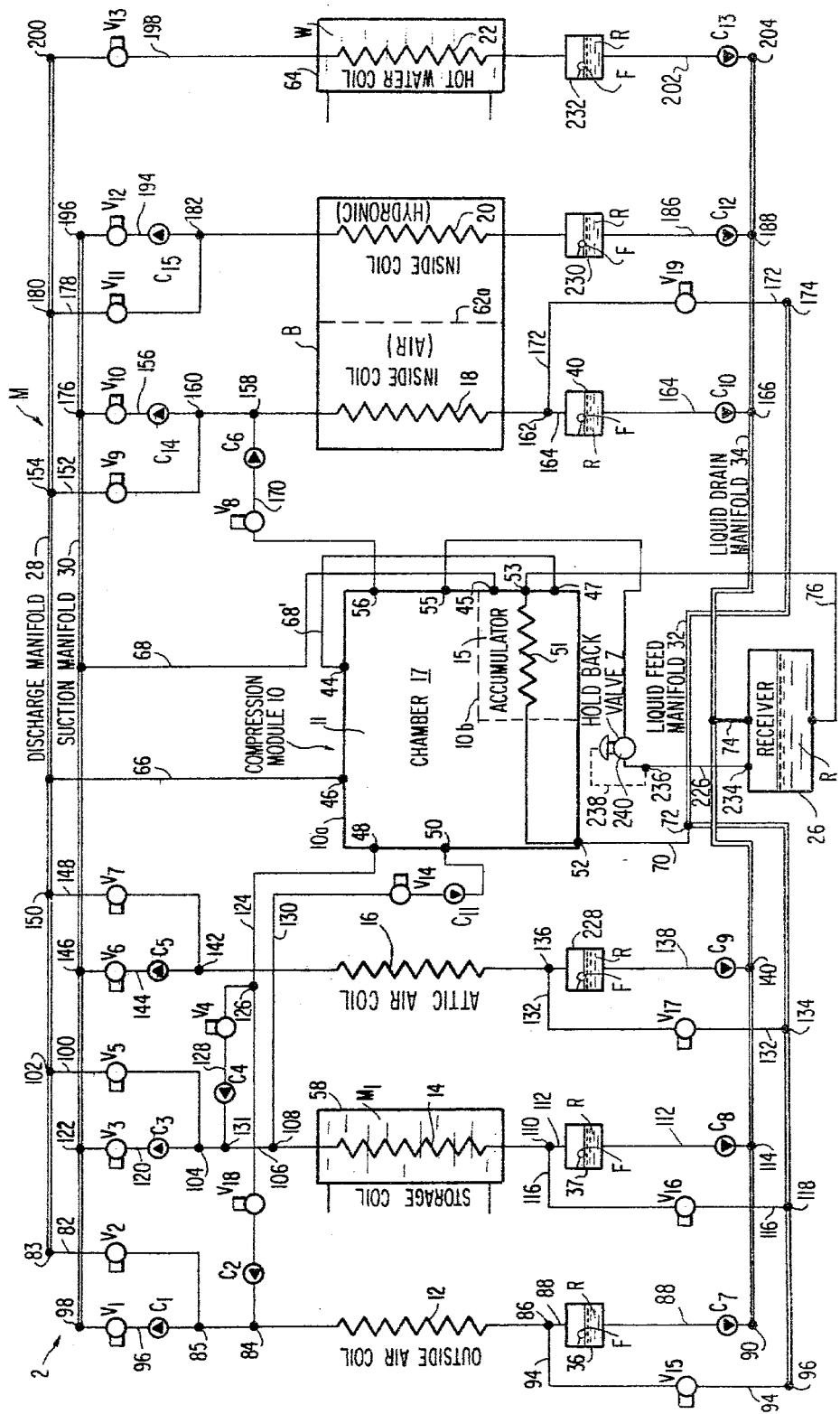
FIG. 9 is a hydraulic schematic diagram of a second embodiment of an attic mounted solar assist multi-source/sink residential heat pump system of the present invention.
Figure 10:
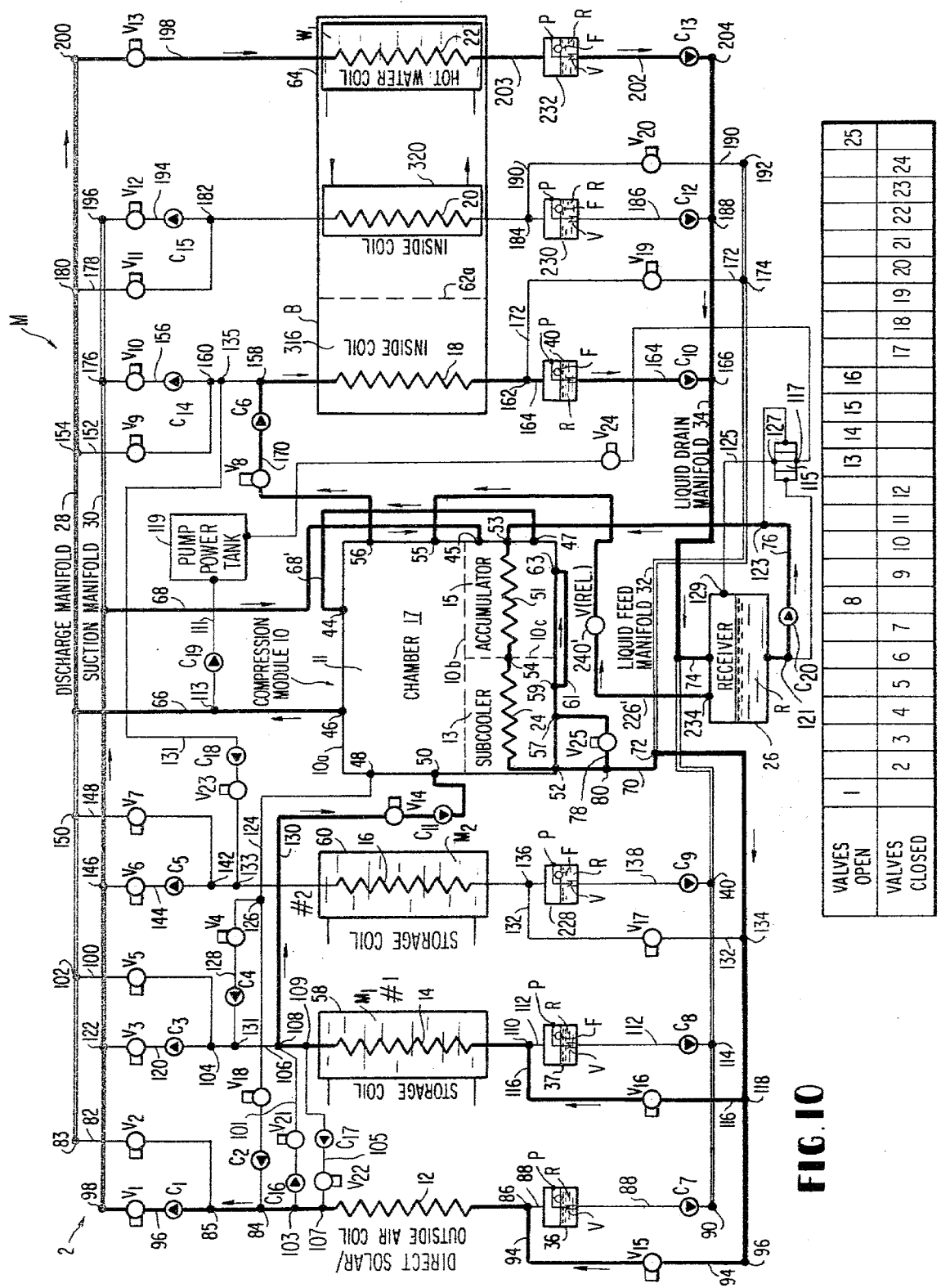
FIG. 10 is a hydraulic schematic diagram of yet another embodiment of the residential heat pump system of the present invention.
Figure 11:
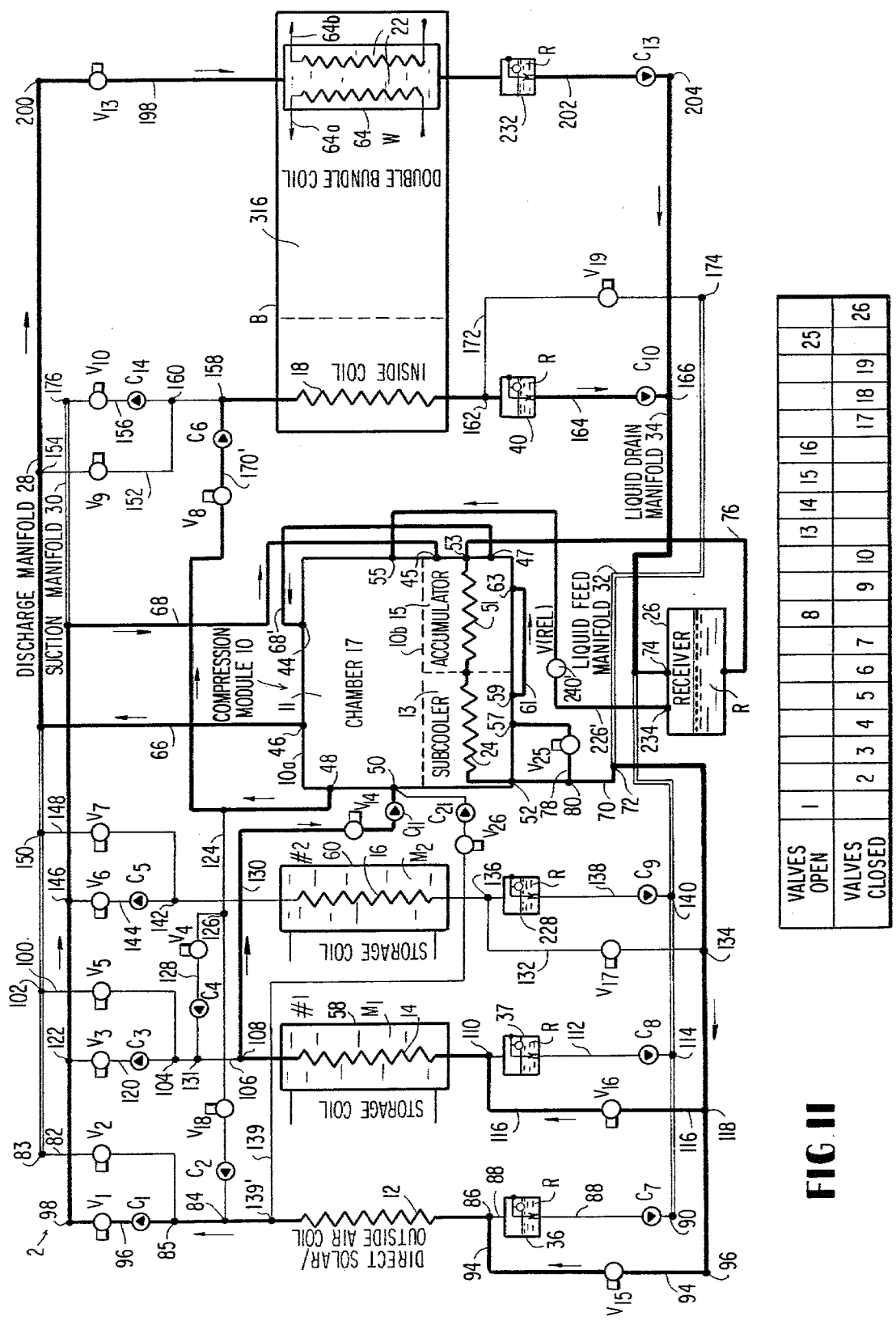
FIG. 11 is a hydraulic schematic diagram of yet another embodiment of the residential heat pump system of the present invention.

FIGS. 9, 10 and 11 are hydraulic schematic diagrams of modified heat pump systems based on the principles of the system disclosed in FIGS. 1–8 inclusive. Like elements are provided with like numerical designations, and the majority of the system componentry remains the same as that set forth in FIG. 8. However, in FIG. 9, instead of a single coil functioning as a direct solar/outside air coil and positioned within the attic and selectively open to the outside or to the solar space 301 within the attic, separate coils are employed. The outside air coil 12 in this case is external of the building and may be mounted on the surface of the ground, in conventional heat pump fashion, while coil 16 in this case constitutes an attic air coil and is constantly maintained open to solar space 301, eliminating the utilization of hoods 344 and 360 with their attendant air inlet grills and air discharge grills at 360 and 346, respectively. Coil 18 constitutes an inside air coil, while coil 20 again functions as the hydronic base board conditioning coil for building space 316. The storage coil 14 is provided for a single storage tank 58 within the ground G or insulated and mounted within building B. Internally of the space 316 to be conditioned is housed the hot water tank 64 bearing hot water coil 22. Further, the hydronic coil functions purely to provide heating load, and, thus, the connection of that coil to the suction manifold and the liquid feed manifold as per lines 190 and 194 are eliminated.

Turning to FIG. 10, coils 12, 14, 16, 18, 20 and 22 are in identical form to the embodiment of FIG. 8. However, in this case, there is added the combination of a suction subcooler/flash economizer with a pressure relief valve in the flash economizer line downstream of the receiver and upstream of the intermediate-pressure injection point 55 of the compressor 11. The pressure relief valve guarantees that the flash economizer defined by the receiver 26 will always operate at a pressure level sufficiently above the highest evaporating pressure such that proper liquid line pressure is always maintained for the liquid feed manifold 32 in order to feed properly the highest pressure level evaporator of the coils 12, 14, 16, 18 and 20 functioning as evaporators within the system. Further, the compression module 10 includes a subcooler 13 defined by partitions 10b and 10c, which subcooler 13 bears subcooler coil 24 in series with the accumulator coil 51 and connected thereto at point 54. The subcooler coil exits from the compression module 10 at point 52, and line 70 leading to the liquid feed manifold 32 at point 80 connects to a bleed line 78 for bleeding liquid refrigerant back to the subcooler, that line including a solenoid operated control valve $V_{25}$ which, when energized and by way of a thermal expansion capability, permits liquid refrigerant to vaporize within the subcooler 13 subcooling the liquid within coil 24 in addition to the subcooling that occurs within the accumulator 15. In this case, line 61 opens to the subcooler at port 59 within the compression module, at one end, and its other end opens to the accumulator 15 at port 63 within compression module 10 so as to supply refrigerant vapor from the subcooler to the accumulator where it mixes with the vapor returning by way of suction manifold 30 to the suction port 44 via line 68'. In this case, line 226' which opens to the receiver 26 at port 234 and which bears the pressure relief valve 240' opens to the intermediate-pressure injection port 55 of the compressor 11 at its opposite end. The pressure relief valve functions to maintain the pressure within the receiver at a pre-determined set value above the saturation pressure of the highest level evaporator for the system provided. In the illustrated embodiment, storage coil 14 return line 130 connects to intermediate-pressure injection port 50 for the compressor 11. In that respect, and as will be appreciated by reference to the patent applications enumerated above, for the compression module 10, ports 44, 46, 48, 50, 55 and 56 are ports associated with the helical screw rotary compressor 11 of that module, while ports 45, 47, 53 and 63 are associated with the accumulator portion of the compression module 10, and ports 52, 57 and 59 are associated with subcooler 13 of that module.

By the utilization of a suction bled subcooler 13, there is the guarantee that the evaporators will be properly fed even with relatively low liquid line pressure such as will exist with the flash economizer/relief valve system provided by seal pots 36, 37, 228, 40, 230 and 232, receiver 26 and pressure relief valve 240'. The outlet of the suction bled subcooler is to the low side of the system —that is, the suction side of compressor 11. It could, alternatively, bleed to the accumulator 15 since the accumulator is at the lowest suction pressure being connected to the suction port 44 by way of line 68'.

Figure 12:
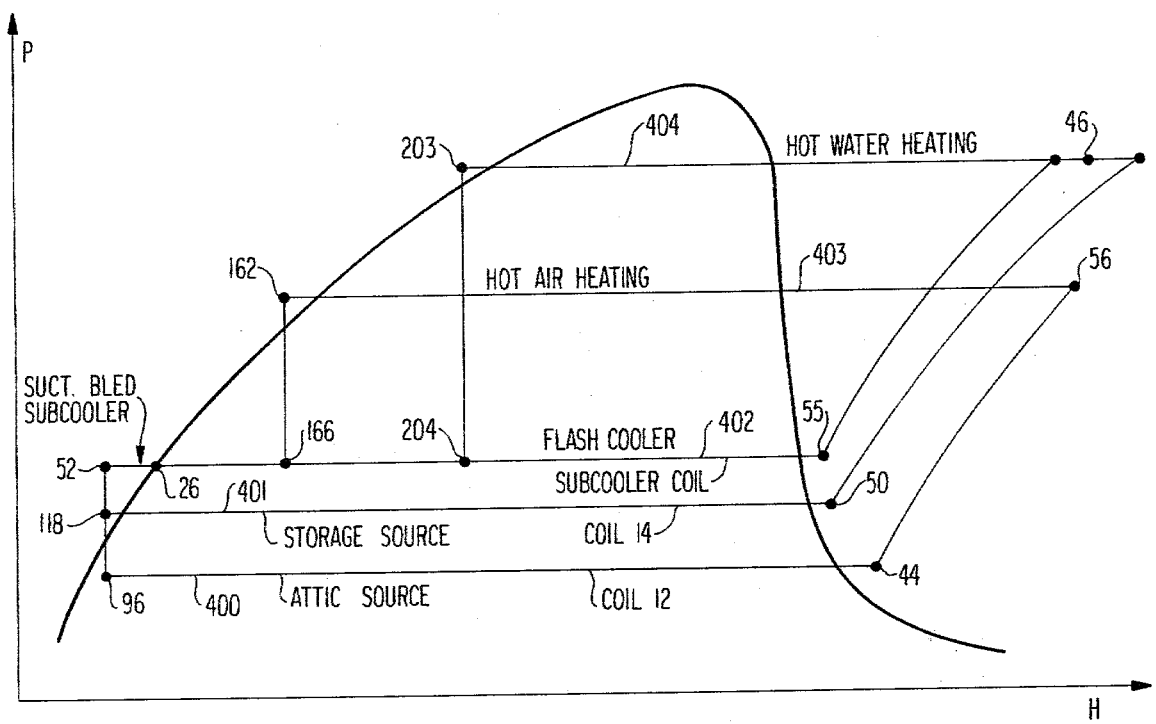
FIG. 12 is a pressure enthalpy diagram for the heat pump system in accordance with FIG. 10.

Reference to FIG. 12 shows in a pressure enthalpy diagram the condition of the refrigerant at various points within the system and under the operating conditions of FIG. 10. In that respect, the hot water coil 22 is functioning as the system high-temperature, high-pressure condenser, the inside coil 18 is functioning to provide hot air heating to the building interior or space 316 to be conditioned. There are two sources of thermal energy for this heating load. The primary source is the direct solar/outside air coil 12 within solar space 301, and the second being thermal energy extraction by way of coil 14 from storage tank 58 acting as an intermediate-pressure evaporator coil, while coil 12 functions as a low-pressure evaporator coil. In this illustrating heating mode, the storage coil 60 is not on the nor is the hydronic coil 20.

Referring to FIGS. 10 and 12, it may be seen that direct solar/outside air coil 12 is picking up the heat from the solar source defined by the solar space 301, with coil 12 functioning as the low-pressure evaporator coil, this being shown graphically along line 400 in FIG. 12 by enthalpy increase between point 96, upstream of coil 12, and suction port 44, FIG. 10. Further, looking to line 401, FIG. 12, immediately above line 400, this line exemplifies the enthalpy increase for the refrigerant vaporizing within the storage coil 14 between point 113, FIG. 10, where the refrigerant is fed to the coil 14, and point 50 constituting the intermediate-pressure vapor injection point for the compression module 10. Line 402 represents the enthalpy loss at flash cooling. Line 403 represents enthalpy loss for the refrigerant between points 56 and 162 for inside coil 18. There is no pressure loss between receiver 26 and the liquid refrigerant discharging from the subcooler coil 24 at point 52, and this liquid refrigerant is above the saturated vapor pressure as defined by storage coil 14 at point 113.

The horizontal line 403 shows enthalpy loss during the heating of the space 316 to be conditioned for building B, FIG. 10. In this case, the pressure is determined by condensing conditions for the refrigerant within coil 18 and for system efficiency increase, the refrigerant is purposely supplied from the compression module 10 at intermediate pressure via the intermediate-pressure ejection port 56 through line 170 to coil 18. Point 162 represents the discharge side of coil 18 prior to the pressure drop through the high side float of seal pot 40. The horizontal line 404 is indicative of the drop in enthalpy during the heating of the hot water W within tank 64 as a result of coil 22 functioning as the system high-temperature, high-pressure condenser, with the compressor full discharge pressure being provided to that coil. Compressor discharge point 46 is shown on the right side of line 404. The pressure drops considerably between points 46 and 203 at respective ends of vertical line 408.

All of the above is achieved under a type of heating mode in FIG. 10, wherein solenoid operated control valves $V_1$, $V_8$, $V_{13}$–$V_{16}$ inclusive and $V_{25}$ are open and solenoid operated control valves $V_2$–$V_7$, $V_9$–$V_{12}$, $V_{17}$, $V_{18}$ and $V_{19}$ are de-energized and closed.

Provisions are additionally made for permitting the system to effect virtually free transfer of thermal energy without the necessity for compressor operation under certain conditions by use of the available temperature differential between a given heat sink and a given heat source. In that respect and illustrating the principle which may be applied to any of the embodiments of this application, in FIG. 10, a line 101 is connected at point 103 to line 82 at one side of the outside air coil 12 and at the other end to line 106 at point 108, the line 101 bearing a check valve $C_{16}$ and a solenoid operated control valve $V_{21}$ which, when energized, permits refrigerant in vapor form, with coil 12 functioning as an evaporator, to flow to the storage coil 14 for condensation therein, with coil 14 functioning as a condenser and permitting the solar energy from the solar space 301 to transfer to storage, increasing the temperature of storage media $M_1$ of storage tank 58. Additionally, a line 105 connects at point 109 to line 106 and at point 107 to line 82, running in parallel to line 101 and including a solenoid operated control valve $V_{22}$ and a check valve $C_{17}$. Permitting control valve $V_{22}$ to be energized under a suitable temperature differential causes the coil 14 to function as an evaporator coil to remove heat from the storage tank media $M_1$ and dissipate it through the direct solar/outside air coil 12, functioning as a condenser.

To assure that the refrigerant in either case flowing from the coil functioning as a condenser back to the receiver will be pumped to the other coil functioning as an evaporator, preferably, the system is further modified to include line 111 which connects to line 66 at point 113 between discharge port 46 and discharge manifold 28 and to a gas operated positive displacement pump 115 at point 117. The line 111 bears check valve $C_{19}$ permitting flow from line 66 to the pump 115 but not vice versa, as well as a pump power tank 119 receiving the high-pressure discharge vapor from the compression module 10 for storage and a solenoid operated control valve $V_{24}$. The pump 115 connects on opposite sides to line 76 at points 121 and 123, line 76 bearing check valve $C_{20}$ therebetween; whereby, absent operation of pump 115, the check valve $C_{20}$ permits receiver pressure to force liquid refrigerant through the accumulator and subcooler and on to the coils functioning as system evaporators. However, absent normal extended compressor operation, the pressure of the refrigerant vapor within the pump power tank 119 feeding to the pump 115 at point 117 forces the liquid refrigerant R to flow to the coil functioning as the evaporator coil in a given free heat transfer situation as, for instance, between the direct solar/outside air coil 12 and the storage coil 14, regardless of which coil is functioning as the evaporator. A line 125 constitutes a return from the gas-powered positive displacement pump 115 at 127 to the receiver 26 at 129 above the level of the accumulated liquid refrigerant R and constitutes an exhaust line for that pump. Alternatively, pump 115 may constitute an electric pump and be energized under such conditions to force the liquid refrigerant R to the coil functioning in free heat transfer as the evaporator coil when the compressor 11 of the compression module 10 is not operating.

Periodically, as the refrigerant working fluid in vapor form constituting the pressurized gas source for the gas pressure operated pump 115 is depleted from the pump power tank 119, the compressor 11 will be required to momentarily operate purely for the purposes of replenishing the gas under pressure within tank 119 for operation of the gas-powered pump 115.

Additionally, FIG. 10 shows a line 131 connected to line 148 bearing the storage coil 16 at point 133 and connected at its opposite end at point 135 to line 152 between the inside coil 18 and the discharge manifold 28. Line 131 includes a solenoid operated control valve $V_{23}$ as well as a check valve $C_{18}$, which check valve permits flow from the inside coil to the storage coil 16 under certain conditions. Absent compressor operation, thermal energy can be transferred from the inside air coil 16, with the inside air coil 18 functioning as the evaporator coil and the storage coil 16 functioning as a condenser, thereby raising the temperature of the media $M_2$ within tank 60. This may be simultaneous with either free storage of thermal energy from the direct solar/outside air coil 12 from the attic heat source to storage coil 14 functioning as a condenser, with solenoid operated control valve $V_{21}$ energized, whereupon thermal energy is dissipated to the outside, with coil 14 functioning as an evaporator coil and coil 12 functioning as a condenser, in which case solenoid operated control valve $V_{22}$ is energized.

From the above, it may be appreciated that the system as shown in FIG. 10 provides virtually free heat transfer from attic to storage, virtually free heat transfer from inside air to storage, with cooling of the building interior space 316 as well as off-peak heat dissipation from storage to outside air with the refrigerant circulated upon condensation by the utilization of the gas-powered pump 115. The off-peak storage to outside air may occur by utilization of two tanks or a single tank, keeping in mind that it is desired to condense in the storage tank unless the temperature of the storage media is greater than the temperature of ambient. Otherwise, thermal energy dissipation occurs under system efficiency conditions which improves by dissipation directly to the outside through coil 12.

The high side float seal pot as at 36, FIG. 10, are shown in greater detail in this figure. The float F is pivoted, for instance, at pivot point P at the side of the seal pot and bears a movable valve element V which rises from the conduit acting as an extension for line 88, for instance, to permit the liquid refrigerant R to flow out of the seal pot after accumulation due to condensation within the outside air coil 12 functioning as a condenser at that moment. Flashing occurs from the seal pot to the receiver 26 under control of the pressure relief valve to maintain the pressure just above the highest evaporator coil pressure for the coils functioning as evaporators under system mode.

Turning next to FIG. 11, the schematic hydraulic diagram illustrates a modified heat pump system in which, in like manner to the embodiment of FIG. 8, there is provided a direct solar/outside air coil 12, and coils 14 and 16 constitute storage coils for first and second storage tanks 58 and 60, respectively. Additionally, coil 18 functions as an inside air coil to heat and cool the space 316 to be conditioned for bulding B, the hydronic coil 20 is eliminated, and the coil 22 functions both as a hot water coil for domestic heating and as a coil for providing heat for hydronic base board heating of the building interior. In this embodiment, the suction bled subcooler/flash economizer as employed in FIG. 10 is utilized, and, additionally, line 139 feeds from point 139' of line 82 to injection port 50, providing a parallel return to port 50 for the outside air coil 12 to that storage coil 14 such that when either one of the coils 12 or 14 functions as a system intermediate-pressure evaporator, refrigerant at intermediate pressure may return via injection port 50 to compressor 11. Line 130 includes check valve $C_{11}$ downstream of solenoid operated control valve $V_{14}$, while line 139 includes solenoid operated control valve $V_{26}$ and check valve $C_{21}$ operating in similar respects. The tank 64 constitutes a double bundle coil 22 baseboard hydronic and domestic hot water heating condensing tank involving two water sides as at 64a and 64b, respectively, for circulating water through the base board hydronic heating system and for permitting additional room separately heating and heating of domestic hot water. In practice, there are two bundles of tubes and either bunder would be condensing depending upon which bundle has water circulating around the inside of its tubes at any one particular time. This is less expensive than the prior embodiments wherein two separate condensers are required. In like manner to the embodiment of FIG. 10, the system is provided with a pressure relief valve 240' within line 226' leading from the receiver to the intermediate-pressure injection port 55 of compressor 11. Further, the flash economizer is employed in conjunction with the suction bled subcooler 13 in the same manner and utilizing the same coils, connections and valving as per the embodiment of FIG. 11. Thus, it is apparent that this embodiment of the invention attempts to reduce the number of coils while providing almost the same versatility as the embodiment of FIG. 8. In this regard, a single intermediate-pressure ejection port 48 is provided which feeds selectively to coils 12, 14 and 18 when functioning as intermediate-pressure condensers controlled by solenoid operated control valves $V_{18}$, $V_4$ and $V_8$, respectively, thus eliminating the ejection port 56. In that regard, the intermediate-pressure vapor injection port 55 could be eliminated with line 226' holding the pressure relief valve for the flash economizer as provided by receiver 26 returning to intermediate-pressure refrigerant vapor injection port 50 along with lines 130 and 139, although the pressure levels for the individual elements would be different absent the common connection at 50.

The operation of the system of FIG. 11 in a basic heating mode may be appreciated by further reference to FIG. 11 and to FIG. 13 which corresponds graphically thereto and constitutes a pressure enthalpy diagram illustrating the multi-pressure connections for compression module 10 and the relevant coils of the system. The system is under a basic heating mode, and partial heating for the space 316 to be conditioned for building B is achieved through the inside air coil 18, while the source of that heat comes from the direct solar/outside air coil 12 within the solar space 301 of the attic A. Additionally, heat is picked up from media $M_1$ of the storage tank 58. As mentioned previously, the system employs the combination of suction bled subcooler/flash economizer as per the embodiment of FIG. 10. While the hot water coil 22 functions to heat both the water W for hot water tank as at 64 and also to provide hydronic heating capability for the building B, in this illustrated mode of operation, no hot water heating is necessary. Valves $V_1$, $V_8$, $V_{13}-V_{16}$ and $V_{25}$ are open, while valves $V_2-V_7$, $V_9$, $V_{10}$, $V_{17}$, $V_{18}$ and $V_{26}$ are closed and de-energized.

While the invention has been particularly shown and described with reference to preferred embodiments thereof, it will be understood by those skilled in the art that the foregoing and other changes in form and details may be made therein without departing from the spirit and scope of the invention. For instance, while the invention has been illustrated in terms of a specific heat pump system for attic installation and employing the attic space as a solar trap by use of a solar window within the attic roof, and wherein coils 12 and 18 are mounted within the attic and open selectively to the outside air, the attic solar space and the space to be conditioned within the building and while the heat pump system has been illustrated in terms of residential use, it is obvious that the invention for application much more broadly to heat pump systems as a whole and to other closed-loop refrigeration systems using the module concept to maximize both system and compressor efficiency.

What is claimed is:

1. A heat pump refrigeration system for conditioning a residential building space or the like, said building comprising an attic thermally isolated from the space to be conditioned, said attic including a solar window facing a solar radiation source such that said attic defines a passive solar collector and forms a solar space, said refrigeration system comprising:

a first heat exchange coil;

a second heat exchange coil, said coils trading functions as evaporator or condenser to absorb heat and discharge heat, respectively;

a compressor;

conduit means carrying refrigerant and defining a closed refrigeration loop circuit including said coils and said compressor and further comprising means for selectively operating said first and second heat exchange coils as evaporator or condenser as required, the improvement comprising:

a first duct within said attic, said first duct housing said first coil and having an inlet and an outlet;

a second duct within said attic and thermally isolated from said first duct, said second duct housing said second coil and having an inlet and an outlet;

blower means for forcing air flow through said ducts;

means for selectively communicating said first duct inlet and outlet to the building exterior or to said attic solar space;

said second duct outlet opening into the building space to be conditioned; and means for communicating said second duct inlet to at least said space to be conditioned, whereby said first coil functions to pick up heat from said solar space or from said outside when functioning as system evaporator or to discharge heat to the outside when functioning as system condenser, and said second coil functions to heat or cool the space to be conditioned when functioning as condenser and evaporator, respectively.

2. A heat pump refrigeration system for conditioning a residential building space or the like, said building comprising an attic thermally isolated from the space to be conditioned, said attic including a solar window facing a solar radiation source such that said attic defines a passive solar collector and forms a solar space, said refrigeration system comprising:

a first heat exchange coil;
a second heat exchange coil,
said coils functioning as evaporators or condensers to absorb heat and discharge heat, respectively;
a compressor;
conduit means carrying refrigerant and defining a closed refrigeration loop circuit including said coils and said compressor and further comprising means for selectively operating said first and second heat exchange coils as evaporator or condenser as required, the improvement comprising:
a first duct positioned within said attic, said first duct housing said first coil and having an inlet and an outlet for said coil;
a second duct thermally isolated from said first duct and positioned within said attic and thermally isolated from said first duct, said second duct housing said second coil and having an inlet and an outlet for said coil;
blower means for forcing air flow through said ducts;
means for selectively communicating said first duct inlet and outlet to the building exterior or to said attic solar space;
said second duct outlet opening into the building space to be conditioned;
an air return opening leading from said space to be conditioned and opening into said second duct upstream of said second coil; and
means for selectively communicating said second duct inlet to said air return opening with said second duct shut off from said outside or said solar space, said second duct inlet and said opening to said solar space, or said second duct inlet and said air return opening to the building exterior,
whereby direct cooling of the space to be conditioned without heat compressor operation may be achieved by directing outside air to said second duct inlet for flow into said space to be conditioned and wherein return air flow through said air return opening communicates to the building exterior; direct solar heating of the space to be conditioned may be achieved without compressor operation by air flow from the solar space through the second duct inlet and into said space to be conditioned and return air flow to said solar space through said air return opening; direct solar heating of the space to be conditioned may be achieved with thermal boost under compressor operation by operating said first coil as system evaporator with said first duct inlet and outlet open to said solar space and with said second coil functioning as system condenser, and wherein normal heat pump cooling and heating may be achieved under compressor operation with said first duct communicating either to the solar space or the outside and the second duct communicating only to the space to be conditioned.

3. The heat pump refrigeration system as claimed in claim 2 wherein:
said first duct comprises a fresh air inlet grill opening to the building exterior at the inlet side of said first coil, and an air discharge grill opening to the building exterior at the outlet side of said first coil;
said blower means comprises a first blower positioned within said first duct and downstream of said first coil; and
said first duct further comprises a first opening within said first duct upstream of said first coil and a first damper within said first opening communicating to said solar space and being pivotable between a first position closing off that duct and permitting fresh air flow from the building exterior to said first coil, and a second position blocking flow of fresh air from the fresh air grill to said first coil but permitting air flow from said solar space through said first coil, and wherein said first duct comprises a second opening which opens to said solar space downstream of said first blower and between said first blower and said air discharge grill, and a second damper being mounted to said first duct at said second opening and movable between a first position closing off communication of said first duct outlet to said solar space but permitting communication to the building exterior through said air discharge grill, and a second position blocking off air discharge to the building exterior and forcing air discharging from said first blower to pass through said second opening and enter said solar space.

4. The heat pump refrigeration system as claimed in claim 2 wherein said second duct air return opening carries an air return grill communicating the second duct inlet to the room being conditioned upstream of said second coil, a second opening within said second duct overlying said grill communicating to said solar space and a second duct damper covering said second opening and being movable between a first position closing off said second opening between said second duct and said solar space to permit return air to pass through said second coil, and a second position in which said return air is permitted to pass through the opening covered by said second duct damper into said solar space, while permitting heated air within said solar space to pass through said second coil and into said second duct outlet, and wherein said blower means further comprises a second blower positioned within said second duct downstream of said second coil for forcing air flow through said second duct for discharge into the space to be conditioned.

5. The heat pump refrigeration system as claimed in claim 3 wherein said second duct air return opening carries an air return grill communicating the second duct inlet to the room being conditioned upstream of said second coil, a second opening within said second duct overlying said grill and communicating to said solar space and a second duct damper covering said second opening and being movable between a first position closing off said second opening between said second duct and said solar space to permit return air to pass through said second coil, and a second position in which said return air is permitted to pass through the opening covered by said second duct damper into said solar space, while permitting heated air within said solar space to pass through said second coil and into said second duct outlet, and wherein said blower means further comprises a second blower positioned within said second duct downstream of said second coil for forcing air flow through said second duct for discharge into the space to be conditioned.

6. The heat pump refrigeration system as claimed in claim 4 wherein a first cross-communication duct is connected at one end to said first duct downstream of said blower and said first duct second damper and in fluid communication therewith, and being connected at its opposite end to said second duct adjacent said air return grill and in fluid communication therewith, and a flow blocking damper mounted within said first communication duct intermediate of its ends and being movable between a position blocking air flow therethrough and an unblocking position in line therewith, and wherein a second communication duct is connected at one end to the first duct upstream of said first duct first damper and at its opposite end to the second duct upstream of said second blower with said second communication duct including an air flow blocking damper mounted within said second communication duct intermediate of its ends and movable between a first position blocking air flow through the second communication duct and a second position in line therewith such that, when said first duct dampers are in a position to block communication between the fresh air inlet grill and said air discharge grill through said first coil, operation of said second blower induces fresh air flow through said fresh air inlet grill, and through said second communication duct for cooling of the space to be conditioned, while permitting return air flow from the space to be conditioned to exit to the building exterior through said air return grill, said second duct, said first communication duct and said air discharge grill of said first duct.

7. The heat pump refrigeration system as claimed in claim 6 further comprising a louvered window within said building attic opening to the building exterior, said louvered window including a plurality of louvers and means for automatically maintaining said louvers closed in the absence of forced air flow into said solar space, whereby, under conditions where said first coil functions as an outside air coil, said first duct first damper may close off said first opening between the first duct inlet and the solar space, and said first duct second damper may block the discharge from the first blower to the building exterior through the air discharge grill and force flow to enter the solar space such that air pressure generated within said solar space forces the window louvers to open, permitting automatic discharge of the heated air therefrom, and wherein said building is further provided with a solar screen selectively movable relative to said solar window to positions where solar radiation into the solar space is unimpeded through said solar window, partially impeded or fully impeded.

8. In a heat pump refrigeration system for conditioning a residential building space or the like, and wherein said building comprises an attic separate from said space to be conditioned and includes a solar window within the attic building structure facing a source of solar radiation with said attic interior and defining a passive solar heat trap and forming a solar space, said system comprising a first heat exchange coil and a second heat exchange coil, said coils trading functions as evaporator and condenser to absorb heat and discharge heat, respectively; a compressor; a receiver; conduit means carrying refrigerant and defining a closed refrigeration loop circuit including said coils, said receiver, and said compressor; means within said circuit for subcooling condensed refrigerant from the coil functioning as a condenser; a third heat exchange coil functioning to supply heat to the circut or to store heat derived therefrom; and a fourth heat exchange coil functioning as a system high temperature condenser for supplying a high temperature heating load, the improvement comprising:
 a first duct within said attic and housing said first coil and having an inlet and an outlet on opposite sides of said first coil;
 a second duct within said attic housing said second coil and having an inlet and an outlet on opposite side of said second coil;
 said second duct outlet directly opening to said building space to be conditioned to form an air circulation path between said second coil and said building space;
 a return air opening for communicating said space to be conditioned to said second duct upstream of said second coil;
 means for selectively communicating said first duct inlet to the building exterior or said attic solar space and said first duct outlet to said building exterior or to said attic solar space;
 means for selectively communicating said second duct inlet to said solar space and for terminating direct communication between said second duct inlet and said building space to be conditioned;
 further means including said second duct for communicating said second duct inlet to the building exterior to permit cooling of the space to be conditioned by outside air in the absence of heat exchange operation of said second coil;
 said compressor comprising at least one intermediate-pressure injection port and at least one intermediate-pressure ejection port;
 said conduit means further including a manifold assembly comprising a discharge manifold, a liquid drain manifold, a liquid feed manifold, and a suction manifold;
 said conduit means further comprising means for selectively connecting said first, said second, said third and said fourth heat exchange coils across said discharge and liquid drain manifolds for permitting said coils to function as condensers within the system;
 said conduit means further comprising means for selectively connecting said first coil, said second coil and said third coil across said liquid feed and suction manifolds for permitting said first, said second and said third coils to function as evaporators within said system;
 said conduit means further comprising means for selectively connecting one of said coils functioning as a system intermediate-pressure codenser to said at least one intermediate-pressure injection port of said compressor and a coil functioning as a system intermediate-pressure evaporator to said at least one intermediate-pressure ejection port; and
 means for insuring refrigerant flow from the coils functioning as condensers regardless of condensing temperature to said receiver and from said receiver to the coils functioning as evaporators, regardless of evaporating temperature.

9. The heat pump refrigeration system as claimed in claim 8 wherein said means for insuring refrigerant flow from the coils functioning as condensers, regardless of condensing temperature, to said receiver and from said receiver to the coils functioning as evaporators, regardless of evaporating temperature, comprises seal pots within the conduit means connecting said first, second, third and fourth coil across said discharge and liquid drain manifolds, each seal pot including a high side float valve, a flash economizer line connecting the receiver to the compression module compressor section and including a pressure relief valve such that the receiver constitutes a flash economizer, with said pressure relief valve set to open at a pressure above the highest evaporating pressure of the coils functioning as system evaporators, and wherein said compression module further includes a subcooler having a subcooler coil therein, with said subcooler coil connected between said receiver and said liquid feed manifold, and wherein means are provided for bleeding subcooled liquid refrigerant downstream of the subcooler coil for supply to the subcooler for vaporization about said subcooler coil, and wherein said subcooler is connected to the suction port of the compression module for returning vaporized refrigerant to the compressor at suction pressure, and means for connecting said flash economizer line to said at least one intermediate-pressure injection port.

10. The heat pump refrigeration system as claimed in claim 9 wherein said compression module further comprises an accumulator including an accumulator coil, said accumulator coil being connected in series with said subcooler coil between said receiver and said liquid feed manifold, a line leading from the accumulator to the compression module suction port, and said subcooler being connected to said accumulator such that the subcooled refrigerant vaporizing within said subcooler about said subcooler coil passes first to the accumulator and then commonly with accumulator vapor return to the compression module suction port.

* * * * *